US010660135B2

(12) United States Patent
Takahashi et al.

(10) Patent No.: US 10,660,135 B2
(45) Date of Patent: May 19, 2020

(54) USER EQUIPMENT AND RANDOM ACCESS METHOD

(71) Applicant: NTT DOCOMO, INC., Tokyo (JP)

(72) Inventors: Hideaki Takahashi, Tokyo (JP); Tooru Uchino, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/767,300

(22) PCT Filed: Mar. 1, 2017

(86) PCT No.: PCT/JP2017/008083
§ 371 (c)(1),
(2) Date: Apr. 10, 2018

(87) PCT Pub. No.: WO2017/150601
PCT Pub. Date: Sep. 8, 2017

(65) Prior Publication Data

US 2018/0302929 A1 Oct. 18, 2018

(30) Foreign Application Priority Data

Mar. 4, 2016 (JP) ................................ 2016-042819
May 26, 2016 (JP) ................................ 2016-105565

(51) Int. Cl.
*H04W 74/08* (2009.01)
*H04W 74/00* (2009.01)
*H04W 72/02* (2009.01)

(52) U.S. Cl.
CPC ....... *H04W 74/0833* (2013.01); *H04W 72/02* (2013.01); *H04W 74/004* (2013.01);
(Continued)

(58) Field of Classification Search
CPC ............ H04W 74/0833; H04W 74/08; H04W 74/006; H04W 72/02; H04W 74/004; H04W 74/008
See application file for complete search history.

(56) References Cited

U.S. PATENT DOCUMENTS

2010/0296467 A1 11/2010 Pelletier et al.
2013/0286958 A1 10/2013 Liang et al.
(Continued)

FOREIGN PATENT DOCUMENTS

JP 2012-525083 A 10/2012
WO 2013/129374 A1 9/2013
(Continued)

OTHER PUBLICATIONS

3GPP TS 36.321 v12.8.0 (Dec. 2015).*
(Continued)

*Primary Examiner* — Jae Y Lee
(74) *Attorney, Agent, or Firm* — Osha Liang LLP

(57) ABSTRACT

User equipment communicating with a base station of a wireless communication system including the base station and the user equipment includes a selection unit configured to select a random access signal group from a plurality of random access signal groups by comparing a size of a message transmitted through a predetermined logical channel with a predetermined threshold value and select a random access signal from the random access signal group; and a transmission unit configured to transmit the random access signal selected by the selection unit to the base station, wherein the transmission unit transmits the message through the predetermined logical channel using a resource allocated according to a response from the base station with respect to the random access signal.

7 Claims, 27 Drawing Sheets

(52) U.S. Cl.
CPC ....... *H04W 74/006* (2013.01); *H04W 74/008* (2013.01); *H04W 74/08* (2013.01)

(56) References Cited

U.S. PATENT DOCUMENTS

| | | | | |
|---|---|---|---|---|
| 2015/0282213 | A1 | 10/2015 | Sun et al. | |
| 2016/0174237 | A1 | 6/2016 | Zhao et al. | |
| 2018/0199381 | A1* | 7/2018 | Rong | H04W 74/08 |

FOREIGN PATENT DOCUMENTS

| | | | |
|---|---|---|---|
| WO | 2013138701 | A2 | 9/2013 |
| WO | 2015/016754 | A1 | 2/2015 |

OTHER PUBLICATIONS

Extended European Search Report issued in counterpart Eurpoean Patent Application No. 17760065.7, dated Jan. 24, 2019 (7 Pages).
Office Action issued in counterpart Japanese Patent Application No. 2016-105565, dated Feb. 1, 2019 (5 Pages).
International Search Report issued in PCT/JP2017/008083 dated May 16, 2017 (4 pages).
Written Opinion of the International Searching Authority issued in PCT/JP2017/008083 dated May 16, 2017 (4 pages).
3GPP TS 36.300 V13.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Dec. 2015 (290 pages).
3GPP TS 36.331 V13.0.0; "3rd Generation Partnership Project; Technical Specification Group Radio Access Network; Evolved Universal Terrestrial Radio Access (E-UTRA); Radio Resource Control (RRC); Protocol specification (Release 13)"; Dec. 2015 (507 pages).
3GPP TS 36.321 V13.0.0; "3rd Generation Partnership Project; Technical Specification Group Radio Access Network; Evolved Universal Terrestrial Radio Access (E-UTRA); Medium Access Control (MAC) protocol specification (Release 13)"; Dec. 2015 (82 pages).
3GPP TS 36.300 V12.8.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2015 (254 pages).
3GPP TS 36.321 V12.8.0; "3rd Generation Partnership Project; Technical Specification Group Radio Access Network; Evolved Universal Terrestrial Radio Access (E-UTRA); Medium Access Control (MAC) protocol specification (Release 12)"; Dec. 2015 (77 pages).
3GPP TR 23.720 V1.2.0; "3rd Generation Partnership Project; Technical Specification Group Services and System Aspects; Architecture enhancements for Cellular Internet of Things (Release 13)"; Nov. 2015 (96 pages)
Ericsson (Rapporteur); "Email discussion report on Message 3 size for NB-IoT"; 3GPP TSG-RAN WG2 #93, Tdoc R2-161745; Malta, Feb. 15-19, 2016 (18 pages).
3GPP TS 36.331 V12.8.0; "3rd Generation Partnership Project; Technical Specification Group Radio Access Network; Evolved Universal Terrestrial Radio Access (E-UTRA); Radio Resource Control (RRC); Protocol specification (Release 12)"; Dec. 2015 (456 pages).
NTT Docomo, Inc.; "RA preamble partitioning for multiple CCCH SDU sizes"; 3GPP TSG-RAN WG2 #94, R2-163368; Nanjing, China; May 23-27, 2016 (7 pages).
Ericsson; "RRC Connection Suspend and Resume"; 3GPP TSG-RAN WG2 #92, Tdoc R2-156395; Anaheim, USA; Nov. 16-20, 2015 (11 pages).
Ericsson; "Security for RRC Connection Suspend and Resume procedure in solution 18 for Narrow Band CIoT"; 3GPP TSG-SA WG3 Meeting #82, S3-160157; Dubrovnik, Croatia; Feb. 1-5, 2016 (7 pages).
JP Office Action of JP Application No. 2016-105565 dated May 23, 2017 (5 pages).
JP Office Action of JP Application No. 2016-105565 dated Jan. 9, 2018 (5 pages).
Office Action issued in the counterpart Japanese Patent Application No. 2016105565, dated Jul. 2, 2019 (10 pages).
ETRI; "Group selection for RA preamble"; 3GPP TSG RAN WG2 #62bis R2-083302; Warsaw, Poland, Jun. 30-Jul. 4, 2008 (6 pages).
Office Action issued in the counterpart Japanese Patent Application No. 2016-105565, dated Jan. 28, 2020 (33 pages).

* cited by examiner

FIG.6

5.1.2 Random Access Resource selection

The Random Access Resource selection procedure shall be performed as follows:

- If *ra-PreambleIndex* (Random Access Preamble) and *ra-PRACH-MaskIndex* (PRACH Mask Index) have been explicitly signalled and *ra-PreambleIndex* is not 000000:
  - the Random Access Preamble and the PRACH Mask Index are those explicitly signalled.
- else the Random Access Preamble shall be selected by the MAC entity as follows:
  - If Msg3 has not yet been transmitted, the MAC entity shall:
    - if Random Access Preambles group B exists:
      - ~~and~~ if the potential message size (UL data available for transmission plus MAC header and, where required, MAC control elements) is greater than *messageSizeGroupA* and if the pathloss is less than $P_{CMAX,c}$ (of the Serving Cell performing the Random Access Procedure) – *preambleInitialReceivedTargetPower* – *deltaPreambleMsg3* – *messagePowerOffsetGroupB*; or
      - if the CCCH SDU size is greater than *messageSizeGroupA*, then:
        - select the Random Access Preambles group B;
    - else:
      - select the Random Access Preambles group A.
  - else, if Msg3 is being retransmitted, the MAC entity shall:
    - select the same group of Random Access Preambles as was used for the preamble transmission attempt corresponding to the first transmission of Msg3.
  - randomly select a Random Access Preamble within the selected group. The random function shall be such that each of the allowed selections can be chosen with equal probability;
  - set PRACH Mask Index to 0.

FIG.7

5.1.2 Random Access Resource selection

The Random Access Resource selection procedure shall be performed as follows:

- If *ra-PreambleIndex* (Random Access Preamble) and *ra-PRACH-MaskIndex* (PRACH Mask Index) have been explicitly signalled and *ra-PreambleIndex* is not 000000:
  - the Random Access Preamble and the PRACH Mask Index are those explicitly signalled.
- else the Random Access Preamble shall be selected by the MAC entity as follows:
  - If Msg3 has not yet been transmitted, the MAC entity shall, except for BL UEs or UEs in enhanced coverage:
    - if Random Access Preambles group B exists:
      - ~~and~~ if the potential message size (UL data available for transmission plus MAC header and, where required, MAC control elements) is greater than *messageSizeGroupA* and if the pathloss is less than $P_{CMAX,c}$ (of the Serving Cell performing the Random Access Procedure) – *preambleInitialReceivedTargetPower* – *deltaPreambleMsg3* – *messagePowerOffsetGroupB*; or
      - if the Random Access procedure was initiated for the CCCH logical channel and the CCCH SDU size plus MAC header is greater than *messageSizeGroupA*, then:
        - select the Random Access Preambles group B;
    - else:
      - select the Random Access Preambles group A.
  - else, if Msg3 is being retransmitted, the MAC entity shall:
    - select the same group of Random Access Preambles as was used for the preamble transmission attempt corresponding to the first transmission of Msg3.
  - randomly select a Random Access Preamble within the selected group. The random function shall be such that each of the allowed selections can be chosen with equal probability;
  - set PRACH Mask Index to 0.

FIG.9

5.1 Random Access procedure

5.1.1 Random Access Procedure initialization

The Random Access procedure described in this subclause is initiated by a PDCCH order, by the MAC sublayer itself or by the RRC sublayer. Random Access procedure on an SCell shall only be initiated by a PDCCH order. If a MAC entity receives a PDCCH transmission consistent with a PDCCH order [5] masked with its C-RNTI, and for a specific Serving Cell, the MAC entity shall initiate a Random Access procedure on this Serving Cell. For Random Access on the SpCell a PDCCH order or RRC optionally indicate the *ra-PreambleIndex* and the *ra-PRACH-MaskIndex*; and for Random Access on an SCell, the PDCCH order indicates the *ra-PreambleIndex* with a value different from 000000 and the *ra-PRACH-MaskIndex*. For the pTAG preamble transmission on PRACH and reception of a PDCCH order are only supported for SpCell.

Before the procedure can be initiated, the following information for related Serving Cell is assumed to be available [8]:

- the available set of PRACH resources for the transmission of the Random Access Preamble, *prach-ConfigIndex*.
- the groups of Random Access Preambles and the set of available Random Access Preambles in each group (SpCell only):

The preambles that are contained in Random Access Preambles group A ~~and~~, Random Access Preambles group B and Random Access Preambles group C are calculated from the parameters *numberOfRA-Preambles* ~~and~~, *sizeOfRA-PreamblesGroupA* and *sizeOfRA-PreamblesGroupC*:

If *sizeOfRA-PreamblesGroupA* is equal to *numberOfRA-Preambles* then there is no Random Access Preambles group B. The preambles in Random Access Preamble group A are the preambles 0 to *sizeOfRA-PreamblesGroupA* – 1 and, if it exists, the preambles in Random Access Preamble group B are the preambles *sizeOfRA-PreamblesGroupA* to *numberOfRA-Preambles* – 1 from the set of 64 preambles as defined in [7]. In addition, if the Random Access Preambles Group C exists, the preambles in Random Access Preamble Group C are the preambles *sizeOfRA-PreamblesGroupA* to *numberOfRA-PreamblesC* – 1 and the preambles in Random Access Preamble group B are the preambles *sizeOfRA-PreamblesGroupC* to *numberOfRA-Preambles* – 1 from the set of 64 preambles as defined in [7].

- if Random Access Preambles group B exists, the thresholds, *messagePowerOffsetGroupB* ~~and~~, *messageSizeGroupA* and *messageSizeGroupC*, the configured UE transmitted power of the Serving Cell performing the Random Access Procedure, $P_{CMAX,c}$ [10], and the offset between the preamble and Msg3, *deltaPreambleMsg3*, that are required for selecting one of the two groups of Random Access Preambles (SpCell only).

FIG.10

5.1.2 Random Access Resource selection

The Random Access Resource selection procedure shall be performed as follows:

- If *ra-PreambleIndex* (Random Access Preamble) and *ra-PRACH-MaskIndex* (PRACH Mask Index) have been explicitly signalled and *ra-PreambleIndex* is not 000000:
  - the Random Access Preamble and the PRACH Mask Index are those explicitly signalled.
- else the Random Access Preamble shall be selected by the MAC entity as follows:
  - If Msg3 has not yet been transmitted, the MAC entity shall:
    - if Random Access Preambles group B exists:
      - if Random Access Preambles group C exists:
        - if the message size of CCCH SDU plus MAC header is equal to *messageSizeGroupC*:
          - select the Random Access Preambles group C;
        - else if the potential message size (UL data available for transmission plus MAC header and, where required, MAC control elements) is greater than *messageSizeGroupCA* and if the pathloss is less than $P_{CMAX,c}$ (of the Serving Cell performing the Random Access Procedure) – *preambleInitialReceivedTargetPower* – *deltaPreambleMsg3* – *messagePowerOffsetGroupB*, then:
          - select the Random Access Preambles group B;
      - else:
        - if the potential message size (UL data available for transmission plus MAC header and, where required, MAC control elements) is greater than *messageSizeGroupA* and if the pathloss is less than $P_{CMAX,c}$ (of the Serving Cell performing the Random Access Procedure) – *preambleInitialReceivedTargetPower* – *deltaPreambleMsg3* – *messagePowerOffsetGroupB*, then:
          - select the Random Access Preambles group B;
    - else:
      - select the Random Access Preambles group A.
  - else, if Msg3 is being retransmitted, the MAC entity shall:
    - select the same group of Random Access Preambles as was used for the preamble transmission attempt corresponding to the first transmission of Msg3.
  - randomly select a Random Access Preamble within the selected group. The random function shall be such that each of the allowed selections can be chosen with equal probability;

FIG.11

***RACH-ConfigCommon* information element**

```
-- ASN1START

RACH-ConfigCommon ::=        SEQUENCE {
    preambleInfo                        SEQUENCE {
        numberOfRA-Preambles                ENUMERATED {
                                                n4, n8, n12, n16 ,n20, n24, n28,
                                                n32, n36, n40, n44, n48, n52, n56,
                                                n60, n64},
        preamblesGroupAConfig               SEQUENCE {
            sizeOfRA-PreamblesGroupA            ENUMERATED {
                                                    n4, n8, n12, n16 ,n20, n24, n28,
                                                    n32, n36, n40, n44, n48, n52, n56,
                                                    n60},
            messageSizeGroupA                   ENUMERATED {b56, b144, b208, b256},
            messagePowerOffsetGroupB            ENUMERATED {
                                                    minusinfinity, dB0, dB5, dB8, dB10, dB12,
                                                    dB15, dB18},
            ...
        }           OPTIONAL                                            -- Need OP

RACH-ConfigCommon-v1250 ::=     SEQUENCE {
    txFailParams-r12                SEQUENCE {
        connEstFailCount-r12                    ENUMERATED {n1, n2, n3, n4},
        connEstFailOffsetValidity-r12           ENUMERATED {s30, s60, s120, s240,
                                                            s300, s420, s600, s900},
        connEstFailOffset-r12                   INTEGER (0..15)      OPTIONAL -- Need OP
    }
}

RACH-ConfigCommon-v13xy ::=     SEQUENCE {
    preamblesGroupCConfig-v13xy         SEQUENCE {
        sizeOfRA-PreamblesGroupC-r13        ENUMERATED {
                                                n4, n8, n12, n16 ,n20, n24, n28,
                                                n32, n36, n40, n44, n48, n52, n56},
        messageSizeGroupC-r13               ENUMERATED {b64, b72, b80, b144, b208, b256},
        messagePowerOffsetGroupB-r13        ENUMERATED {
                                                minusinfinity, dB0, dB5, dB8, dB10, dB12,
                                                dB15, dB18},
    ...
    }
}

RACH-ConfigCommonSCell-r11 ::=      SEQUENCE {
    powerRampingParameters-r11              PowerRampingParameters,
    ra-SupervisionInfo-r11                  SEQUENCE {
        preambleTransMax-r11                    PreambleTransMax
    },
    ...
}

PowerRampingParameters ::=          SEQUENCE {
    powerRampingStep                    ENUMERATED {dB0, dB2,dB4, dB6},
    preambleInitialReceivedTargetPower  ENUMERATED {
                                            dBm-120, dBm-118, dBm-116, dBm-114, dBm-112,
                                            dBm-110, dBm-108, dBm-106, dBm-104, dBm-102,
                                            dBm-100, dBm-98, dBm-96, dBm-94,
                                            dBm-92, dBm-90}
}

PreambleTransMax ::=                ENUMERATED {
                                        n3, n4, n5, n6, n7,    n8, n10, n20, n50,
                                        n100, n200}

-- ASN1STOP
```

FIG.12

| RACH-ConfigCommon field descriptions |
|---|
| ***connEstFailCount***<br>Number of times that the UE detects T300 expiry on the same cell before applying *connEstFailOffset*. |
| ***connEstFailOffset***<br>Parameter "$Qoffset_{temp}$" in TS 36.304 [4]. If the field is not present the value of infinity shall be used for "$Qoffset_{temp}$". |
| ***connEstFailOffsetValidity***<br>Amount of time that the UE applies *connEstFailOffset* before removing the offset from evaluation of the cell. Value s30 corresponds to 30 seconds, s60 corresponds to 60 seconds, and so on. |
| ***mac-ContentionResolutionTimer***<br>Timer for contention resolution in TS 36.321 [6]. Value in subframes. Value sf8 corresponds to 8 subframes, sf16 corresponds to 16 subframes and so on. |
| ***maxHARQ-Msg3Tx***<br>Maximum number of Msg3 HARQ transmissions in TS 36.321 [6], used for contention based random access. Value is an integer. |
| ***messagePowerOffsetGroupB***<br>Threshold for preamble selection in TS 36.321 [6]. Value in dB. Value minusinfinity corresponds to –infinity. Value dB0 corresponds to 0 dB, dB5 corresponds to 5 dB and so on. |
| ***messageSizeGroupA***<br>Threshold for preamble selection in TS 36.321 [6]. Value in bits. Value b56 corresponds to 56 bits, b144 corresponds to 144 bits and so on. |
| ***numberOfRA-Preambles***<br>Number of non-dedicated random access preambles in TS 36.321 [6]. Value is an integer. Value n4 corresponds to 4, n8 corresponds to 8 and so on. |
| ***powerRampingStep***<br>Power ramping factor in TS 36.321 [6]. Value in dB. Value dB0 corresponds to 0 dB, dB2 corresponds to 2 dB and so on. |
| ***preambleInitialReceivedTargetPower***<br>Initial preamble power in TS 36.321 [6]. Value in dBm. Value dBm-120 corresponds to -120 dBm, dBm-118 corresponds to -118 dBm and so on. |
| ***preamblesGroupAConfig***<br>Provides the configuration for preamble grouping in TS 36.321 [6]. If the field is not signalled, the size of the random access preambles group A [6] is equal to *numberOfRA-Preambles*. |
| ***preambleTransMax***<br>Maximum number of preamble transmission in TS 36.321 [6]. Value is an integer. Value n3 corresponds to 3, n4 corresponds to 4 and so on. |
| ***ra-ResponseWindowSize***<br>Duration of the RA response window in TS 36.321 [6]. Value in subframes. Value sf2 corresponds to 2 subframes, sf3 corresponds to 3 subframes and so on. The same value applies for each serving cell (although the associated functionality is performed independently for each cell). |
| ***sizeOfRA-PreamblesGroupA, sizeOfRA-PreamblesGroupC***<br>Size of the random access preambles group A and C in TS 36.321 [6]. Value is an integer. Value n4 corresponds to 4, n8 corresponds to 8 and so on. |

FIG.15

5.1 Random Access procedure

5.1.1 Random Access Procedure initialization

The Random Access procedure described in this subclause is initiated by a PDCCH order, by the MAC sublayer itself or by the RRC sublayer. Random Access procedure on an SCell shall only be initiated by a PDCCH order. If a MAC entity receives a PDCCH transmission consistent with a PDCCH order [5] masked with its C-RNTI, and for a specific Serving Cell, the MAC entity shall initiate a Random Access procedure on this Serving Cell. For Random Access on the SpCell a PDCCH order or RRC optionally indicate the *ra-PreambleIndex* and the *ra-PRACH-MaskIndex*; and for Random Access on an SCell, the PDCCH order indicates the *ra-PreambleIndex* with a value different from 000000 and the *ra-PRACH-MaskIndex*. For the pTAG preamble transmission on PRACH and reception of a PDCCH order are only supported for SpCell.

Before the procedure can be initiated, the following information for related Serving Cell is assumed to be available [8]:

- the available set of PRACH resources for the transmission of the Random Access Preamble, *prach-ConfigIndex*.

the groups of Random Access Preambles and the set of available Random Access Preambles in each group (SpCell only):

The preambles that are contained in Random Access Preambles group A ~~and~~, Random Access Preambles group B, Rand Access Preambles Group C and Random Access Preambles group D are calculated from the parameters *numberOfRA-Preambles* ~~and~~, *sizeOfRA-PreamblesGroupA* and *sizeOfRA-PreamblesGroupC*:

If *sizeOfRA-PreamblesGroupA* is equal to *numberOfRA-Preambles* then there is no Random Access Preambles group B. The preambles in Random Access Preamble group A are the preambles 0 to *sizeOfRA-PreamblesGroupA* – 1 and, if it exists, the preambles in Random Access Preamble group B are the preambles *sizeOfRA-PreamblesGroupA* to *numberOfRA-Preambles* – 1 from the set of 64 preambles as defined in [7]. In addition, if the Random Access Preambles Group C and D exist, the preambles in Random Access Preamble Group C are the preambles *sizeOfRA-PreamblesGroupA* to *numberOfRA-PreamblesC* – 1, the preambles in Random Access Preamble Group D are the preambles *sizeOfRA-PreamblesGroupC* to *numberOfRA-PreamblesD* – 1 and the preambles in Random Access Preamble group B are the preambles *sizeOfRA-PreamblesGroupD* to *numberOfRA-Preambles* – 1 from the set of 64 preambles as defined in [7].

- if Random Access Preambles group B exists, the thresholds, *messagePowerOffsetGroupB* ~~and~~, *messageSizeGroupA* and *messageSizeGroupC*, the configured UE transmitted power of the Serving Cell performing the Random Access Procedure, $P_{CMAX,c}$ [10], and the offset between the preamble and Msg3, *deltaPreambleMsg3*, that are required for selecting one of the two groups of Random Access Preambles (SpCell only).

the RA response window size *ra-ResponseWindowSize*.

FIG.16

5.1.2 Random Access Resource selection

The Random Access Resource selection procedure shall be performed as follows:

- If *ra-PreambleIndex* (Random Access Preamble) and *ra-PRACH-MaskIndex* (PRACH Mask Index) have been explicitly signalled and *ra-PreambleIndex* is not 000000:
  - the Random Access Preamble and the PRACH Mask Index are those explicitly signalled.
- else the Random Access Preamble shall be selected by the MAC entity as follows:
  - If Msg3 has not yet been transmitted, the MAC entity shall:
    - if Random Access Preambles group B exists:
      - if Random Access Preambles group C exists:
        - if the potential message size (UL data available for transmission plus MAC header and, where required, MAC control elements) is greater than *messageSizeGroupCA* and if the pathloss is less than $P_{CMAX,c}$ (of the Serving Cell performing the Random Access Procedure) – *preambleInitialReceivedTargetPower* – *deltaPreambleMsg3* – *messagePowerOffsetGroupB*, then:
          - select the Random Access Preambles group B;
        - if the message size of CCCH SDU plus MAC header is equal to *messageSizeGroupC*:
          - select the Random Access Preambles group C;
        - else if the potential message size (UL data available for transmission plus MAC header and, where required, MAC control elements) is greater than *messageSizeGroupA* and less than *messageSizeGroupC*:
          - select the Random Access Preambles group D;
      - else:
        - if the potential message size (UL data available for transmission plus MAC header and, where required, MAC control elements) is greater than *messageSizeGroupA* and if the pathloss is less than $P_{CMAX,c}$ (of the Serving Cell performing the Random Access Procedure) – *preambleInitialReceivedTargetPower* – *deltaPreambleMsg3* – *messagePowerOffsetGroupB*, then:
          - select the Random Access Preambles group B;
    - else:
      - select the Random Access Preambles group A.
  - else, if Msg3 is being retransmitted, the MAC entity shall:
    - select the same group of Random Access Preambles as was used for the preamble transmission attempt corresponding to the first transmission of Msg3.

FIG.17

***RACH-ConfigCommon* information element**

```
-- ASN1START

RACH-ConfigCommon ::=       SEQUENCE {
    preambleInfo                      SEQUENCE {
        numberOfRA-Preambles              ENUMERATED {
                                              n4, n8, n12, n16 ,n20, n24, n28,
                                              n32, n36, n40, n44, n48, n52, n56,
                                              n60, n64},
        preamblesGroupAConfig             SEQUENCE {
            sizeOfRA-PreamblesGroupA          ENUMERATED {
                                                  n4, n8, n12, n16 ,n20, n24, n28,
                                                  n32, n36, n40, n44, n48, n52, n56,
                                                  n60},
            messageSizeGroupA                 ENUMERATED {b56, b144, b208, b256},
            messagePowerOffsetGroupB          ENUMERATED {
                                                      minusinfinity, dB0, dB5, dB8, dB10, dB12,
                                                      dB15, dB18},
            ...
        }           OPTIONAL                                                   -- Need OP

RACH-ConfigCommon-v1250 ::=     SEQUENCE {
    txFailParams-r12                SEQUENCE {
        connEstFailCount-r12                  ENUMERATED {n1, n2, n3, n4},
        connEstFailOffsetValidity-r12         ENUMERATED {s30, s60, s120, s240,
                                                            s300, s420, s600, s900},
        connEstFailOffset-r12                 INTEGER (0..15)      OPTIONAL     -- Need OP
    }
}

RACH-ConfigCommon-v13xy ::=     SEQUENCE {
    preamblesGroupCConfig-v13xy       SEQUENCE {
        sizeOfRA-PreamblesGroupC-r13      ENUMERATED {
                                              n4, n8, n12, n16 ,n20, n24, n28,
                                              n32, n36, n40, n44, n48, n52, n56},
        messageSizeGroupC-r13             ENUMERATED {b64, b72, b80, b144, b208, b256},
        messagePowerOffsetGroupB-r13      ENUMERATED {
                                              minusinfinity, dB0, dB5, dB8, dB10, dB12,
                                              dB15, dB18},
        sizeOfRA-PreamblesGroupD-r13      ENUMERATED {
                                              n4, n8, n12, n16 ,n20, n24, n28,
                                              n32, n36, n40, n44, n48, n52},
    ...
    }
}

RACH-ConfigCommonSCell-r11 ::=      SEQUENCE {
    powerRampingParameters-r11          PowerRampingParameters,
    ra-SupervisionInfo-r11              SEQUENCE {
        preambleTransMax-r11                PreambleTransMax
    },
    ...
}

PowerRampingParameters ::=          SEQUENCE {
    powerRampingStep                  ENUMERATED {dB0, dB2,dB4, dB6},
    preambleInitialReceivedTargetPower ENUMERATED {
                                          dBm-120, dBm-118, dBm-116, dBm-114, dBm-112,
                                          dBm-110, dBm-108, dBm-106, dBm-104, dBm-102,
                                          dBm-100, dBm-98, dBm-96, dBm-94,
                                          dBm-92, dBm-90}
}

PreambleTransMax ::=                ENUMERATED {
                                        n3, n4, n5, n6, n7,    n8, n10, n20, n50,
                                        n100, n200}

-- ASN1STOP
```

FIG.18

| RACH-ConfigCommon field descriptions |
|---|
| ***connEstFailCount***<br>Number of times that the UE detects T300 expiry on the same cell before applying *connEstFailOffset*. |
| ***connEstFailOffset***<br>Parameter "$Qoffset_{temp}$" in TS 36.304 [4]. If the field is not present the value of infinity shall be used for "$Qoffset_{temp}$". |
| ***connEstFailOffsetValidity***<br>Amount of time that the UE applies *connEstFailOffset* before removing the offset from evaluation of the cell. Value s30 corresponds to 30 seconds, s60 corresponds to 60 seconds, and so on. |
| ***mac-ContentionResolutionTimer***<br>Timer for contention resolution in TS 36.321 [6]. Value in subframes. Value sf8 corresponds to 8 subframes, sf16 corresponds to 16 subframes and so on. |
| ***maxHARQ-Msg3Tx***<br>Maximum number of Msg3 HARQ transmissions in TS 36.321 [6], used for contention based random access. Value is an integer. |
| ***messagePowerOffsetGroupB***<br>Threshold for preamble selection in TS 36.321 [6]. Value in dB. Value minusinfinity corresponds to –infinity. Value dB0 corresponds to 0 dB, dB5 corresponds to 5 dB and so on. |
| ***messageSizeGroupA***<br>Threshold for preamble selection in TS 36.321 [6]. Value in bits. Value b56 corresponds to 56 bits, b144 corresponds to 144 bits and so on. |
| ***numberOfRA-Preambles***<br>Number of non-dedicated random access preambles in TS 36.321 [6]. Value is an integer. Value n4 corresponds to 4, n8 corresponds to 8 and so on. |
| ***powerRampingStep***<br>Power ramping factor in TS 36.321 [6]. Value in dB. Value dB0 corresponds to 0 dB, dB2 corresponds to 2 dB and so on. |
| ***preambleInitialReceivedTargetPower***<br>Initial preamble power in TS 36.321 [6]. Value in dBm. Value dBm-120 corresponds to -120 dBm, dBm-118 corresponds to -118 dBm and so on. |
| ***preamblesGroupAConfig***<br>Provides the configuration for preamble grouping in TS 36.321 [6]. If the field is not signalled, the size of the random access preambles group A [6] is equal to *numberOfRA-Preambles*. |
| ***preambleTransMax***<br>Maximum number of preamble transmission in TS 36.321 [6]. Value is an integer. Value n3 corresponds to 3, n4 corresponds to 4 and so on. |
| ***ra-ResponseWindowSize***<br>Duration of the RA response window in TS 36.321 [6]. Value in subframes. Value sf2 corresponds to 2 subframes, sf3 corresponds to 3 subframes and so on. The same value applies for each serving cell (although the associated functionality is performed independently for each cell). |
| ***sizeOfRA-PreamblesGroupA, sizeOfRA-PreamblesGroupC***<br>Size of the random access preambles group A and C in TS 36.321 [6]. Value is an integer. Value n4 corresponds to 4, n8 corresponds to 8 and so on. |

FIG.20

5.1 Random Access procedure

5.1.1 Random Access Procedure initialization

The Random Access procedure described in this subclause is initiated by a PDCCH order, by the MAC sublayer itself or by the RRC sublayer. Random Access procedure on an SCell shall only be initiated by a PDCCH order. If a MAC entity receives a PDCCH transmission consistent with a PDCCH order [5] masked with its C-RNTI, and for a specific Serving Cell, the MAC entity shall initiate a Random Access procedure on this Serving Cell. For Random Access on the SpCell a PDCCH order or RRC optionally indicate the *ra-PreambleIndex* and the *ra-PRACH-MaskIndex*; and for Random Access on an SCell, the PDCCH order indicates the *ra-PreambleIndex* with a value different from 000000 and the *ra-PRACH-MaskIndex*. For the pTAG preamble transmission on PRACH and reception of a PDCCH order are only supported for SpCell.

Before the procedure can be initiated, the following information for related Serving Cell is assumed to be available [8]:

- the available set of PRACH resources for the transmission of the Random Access Preamble, *prach-ConfigIndex*.
- the available set of PRACH resources associated with each message size of Msg.3 supported in the Serving Cell for the transmission of the Random Access Preamble, *prach-ConfigIndex*.
- the groups of Random Access Preambles and the set of available Random Access Preambles in each group (SpCell only):

The preambles that are contained in Random Access Preambles group A and Random Access Preambles group B are calculated from the parameters *numberOfRA-Preambles* and *sizeOfRA-PreamblesGroupA*:

If *sizeOfRA-PreamblesGroupA* is equal to *numberOfRA-Preambles* then there is no Random Access Preambles group B. The preambles in Random Access Preamble group A are the preambles 0 to *sizeOfRA-PreamblesGroupA* – 1 and, if it exists, the preambles in Random Access Preamble group B are the preambles *sizeOfRA-PreamblesGroupA* to *numberOfRA-Preambles* – 1 from the set of 64 preambles as defined in [7].

- if Random Access Preambles group B exists, the thresholds, *messagePowerOffsetGroupB* and *messageSizeGroupA*, the configured UE transmitted power of the Serving Cell performing the Random Access Procedure, $P_{CMAX,c}$ [10], and the offset between the preamble and Msg3, *deltaPreambleMsg3*, that are required for selecting one of the two groups of Random Access Preambles (SpCell only).
- the RA response window size *ra-ResponseWindowSize*.

FIG.21

5.1.2 Random Access Resource selection

The Random Access Resource selection procedure shall be performed as follows:

- If *ra-PreambleIndex* (Random Access Preamble) and *ra-PRACH-MaskIndex* (PRACH Mask Index) have been explicitly signalled and *ra-PreambleIndex* is not 000000:
  - the Random Access Preamble and the PRACH Mask Index are those explicitly signalled.
- else the Random Access Preamble shall be selected by the MAC entity as follows:
  - if the message size of CCCH SDU if included in Msg.3 is equal to the value indicated in *MessageSizeOfMsg3* within *MessageSizePrachInfoList*, then:
    - the corresponding *PRACH-ParametersMsgSize* is considered as available PRACH resources;
  - else:
    - the PRACH resources indicated in *PRACH-ConfigSIB* (without suffix) or *PRACH-Config* (without suffix) are sonsidered as available PRACH resources;
  - If Msg3 has not yet been transmitted, the MAC entity shall:
    - if Random Access Preambles group B exists and if the potential message size (UL data available for transmission plus MAC header and, where required, MAC control elements) is greater than *messageSizeGroupA* and if the pathloss is less than $P_{CMAX,c}$ (of the Serving Cell performing the Random Access Procedure) – *preambleInitialReceivedTargetPower* – *deltaPreambleMsg3* – *messagePowerOffsetGroupB*, then:
      - select the Random Access Preambles group B;
    - else:
      - select the Random Access Preambles group A.
  - else, if Msg3 is being retransmitted, the MAC entity shall:
    - select the same group of Random Access Preambles as was used for the preamble transmission attempt corresponding to the first transmission of Msg3.
  - randomly select a Random Access Preamble within the selected group. The random function shall be such that each of the allowed selections can be chosen with equal probability;
  - set PRACH Mask Index to 0.

FIG.22

***PRACH-Config* information elements**

```
-- ASN1START

PRACH-ConfigSIB ::=                 SEQUENCE {
    rootSequenceIndex                   INTEGER (0..837),
    prach-ConfigInfo                    PRACH-ConfigInfo
}

PRACH-ConfigSIB-v13xy ::=           SEQUENCE {
    messageSizePrachInfoList-r13        MessageSizePrachInfoList-r13,
    prach-ParametersListMsgSize-r13     PRACH-ParametersListMsgSize-r13
}

PRACH-Config ::=                    SEQUENCE {
    rootSequenceIndex                   INTEGER (0..837),
    prach-ConfigInfo                    PRACH-ConfigInfo                OPTIONAL -- Need ON
}

PRACH-ConfigSCell-r10 ::=               SEQUENCE {
    prach-ConfigIndex-r10                   INTEGER (0..63)
}

PRACH-ConfigInfo ::=                SEQUENCE {
    prach-ConfigIndex                   INTEGER (0..63),
    highSpeedFlag                       BOOLEAN,
    zeroCorrelationZoneConfig           INTEGER (0..15),
    prach-FreqOffset                    INTEGER (0..94)
}

PRACH-ParametersListMsgSize-r13 ::= SEQUENCE (SIZE(1..maxNumMsgSize-r13)) OF PRACH-
ParametersMsgSize-r13

PRACH-ParametersMsgSize-r13 ::=         SEQUENCE {
    rootSequenceIndex-r13                   INTEGER (0..837),
    prach-ConfigInfo-r13                    PRACH-ConfigInfo
}

MessageSizePrachInfoList-r13 ::= SEQUENCE (SIZE(1.. maxNumMsgSize-r13)) OF MessageSizeOfMsg3-r13

MessageSizeOfMsg3-r13 ::=               ENUMERATED {b64, b72, b80, b144, b208, b256}

-- ASN1STOP
```

USER EQUIPMENT AND RANDOM ACCESS METHOD

TECHNICAL FIELD

The present invention relates to a random access procedure executed between user equipment (hereinafter, referred to as a UE) and a base station (hereinafter, referred to as an eNB) in a wireless communication system.

BACKGROUND ART

In a wireless communication system such as LTE, a random access (hereinafter, abbreviated to RA) procedure is executed when a UE establishes a connection with an eNB, when the UE performs reconnection (resynchronization), or the like. The RA procedure includes a contention type RA procedure and a non-contention type RA procedure. The contention type RA procedure can be used for all purposes, and the non-contention type RA procedure is used for specific purposes such as handover. Here, the contention type RA procedure is used.

In the RA procedure, the UE transmits an RA preamble to the eNB, and the eNB returns an RA response to the UE. Then, the UE transmits a control message to the eNB by using an uplink resource allocated through a UL grant in the RA response. The control message is referred to as Message 3 (Non-Patent Document 1).

With respect to Message 3, an RRCConnectionRequest message is transmitted at the time of connection, and an RRCConnectionReestablishmentRequest message is transmitted through common control channel (CCCH) which is a logical channel at the time of reconnection.

The RRCConnectionRequest message and the RRCConnectionReestablishementRequest message are collectively referred to as a CCCH service data unit (SDU) in terms of standard specifications. The size of the RRCConnectionRequest message and the size of the RRCConnectionReestablishmentRequest message are both 48 bits, and 8 bits of an MAC header are added to the messages, and the size of an MAC PDU is 56 bits. Namely, the 56-bit data becomes one Transport Block that can be transmitted through a physical layer (PHY), and the size (56 bits) thereof becomes transport block size (TBS).

PRIOR ART DOCUMENT

Non-Patent Document

Non-Patent Document 1: 3GPP TS 36.300 V12.8.0 (December 2015)

Non-Patent Document 2: 3GPP TS 36.321 V12.8.0 (December 2015)

Non-Patent Document 3: 3GPP TR 23.720 V1.2.0 (November 2015)

Non-Patent Document 4: 3GPP R2-161745

Non-Patent Document 5: 3GPP TS 36.331 V12.8.0 (December 2015)

SUMMARY OF THE INVENTION

Problem to be Solved by the Invention

A value greater than 56 bits can be allocated as the TBS of Message 3. In this case, for example, padding buffer status report (Padding BSR) or the like is added to the data. In LTE, it is defined that the UE performs the RA procedure by grouping the RA preambles and using the RA preamble selected from the group (Non-Patent Document 2). The eNB can determine whether the size of Message 3 is to be greater according to the group to which the transmitted RA preamble belongs and can report, to the UE, the corresponding TBS with RA response.

Specifically, as disclosed in Non-Patent Document 2, preamble group A and B are provided. Then, when the preamble group B exists, the size of Message 3 is larger than the message size (MessageSizeGroupA in RACH-ConfigCommon) set in the system information, and the path loss is a predetermined value or less, the RA preamble is selected from the preamble group B. Otherwise, the RA preamble is selected from the preamble group A.

Meanwhile, a mechanism has been studied, which is for reducing a signaling amount for connection by storing the UE context in the eNB and the UE when the UE is in the idle state and using the stored UE context when the UE transitions to the connected state. For example, an example thereof is disclosed in Non-Patent Document 3, as solution 18.

In this mechanism, in order to resume the RRC connection by using the stored UE context, the UE transmits a resume request message through Message 3. Since ID and authentication information used for resuming the connection are added to this message, the message size may exceed 56 bits of the TBS of the existing CCCH SDU (for example, Non-Patent Document 4).

Accordingly, it is likely that a plurality of CCCH SDUs having different message sizes are defined. When a plurality of CCCH SDUs having different message sizes are defined, the UE transmits the CCCH SDUs having different sizes to the eNB according to the procedure. As an example, it is assumed that the UE transmits a normal RRC connection request with a 56-bit TBS and transmits an RRC connection resume with a 64-bit TBS.

In the related art, the message size of the CCCH SDU is one (TBS: 56 bits). However, when the CCCH SDUs having different message sizes are defined, the eNB needs to decide which TBS is to be allocated through the UL grant by considering the size of the CCCH SDU before the UL grant of Message 3 with the RA response is allocated. However, in the mechanism of the related art, since the eNB may not be aware of the message size of the CCCH SDU prior to transmission of the RA response, the TSB may not be determined to which to the UL grant is to be allocated while considering the size of the CCCH SDU. Consequently, for example, even if the UE attempts to transmit the resume request message, a situation may in which the TBS is insufficient, so that transmission may not be performed.

In addition, the above-described problem may occur when a control message other than the resume request message is to be transmitted.

The present invention has been achieved in view of the above-described point, and an object is to provide a technique for preventing user equipment from being unable to transmit a control message due to shortage of uplink resources allocated by a base station in a random access procedure.

Means for Solving the Problem

According to an embodiment of the present invention, there is provided user equipment communicating with a base station of a radio communication system including the base station and the user equipment, the user equipment including a selection unit configured to select a random access signal group from a plurality of random access signal groups by comparing a size of a message transmitted through a predetermined logical channel with a predetermined threshold value and select a random access signal from the random access signal group; and a transmission unit configured to transmit the random access signal selected by the selection unit to the base station, wherein the transmission unit transmits the message through the predetermined logical channel using a resource allocated by a response from the base station with respect to the random access signal.

In addition, according to an embodiment of the present invention, there is provided user equipment communicating with a base station of a wireless communication system including the base station and the user equipment, the user equipment including a reception unit which receives, from the base station, information on a correspondence relationship between a size of a message transmitted through a predetermined logical channel and a resource of a random access signal; a selection unit configured to select a resource corresponding to the size of the message transmitted through the predetermined logical channel from the information on the correspondence relationship; and a transmission unit configured to transmit a random access signal to the base station using the selected resource.

Advantage of the Invention

According to an embodiment of the present invention, there is provided a technique for preventing user equipment from being unable to transmit a control message due to shortage of uplink resources allocated from a base station in a random access procedure.

BRIEF DESCRIPTION OF DRAWINGS

FIG. 6 is a diagram illustrating a specification change example in Example 1;

FIG. 7 is a diagram illustrating a specification change example in Example 1;

FIG. 9 is a diagram illustrating a specification change example in Example 2;

FIG. 10 is a diagram illustrating a specification change example in Example 2;

FIG. 11 is a diagram illustrating a specification change example in Example 2;

FIG. 12 is a diagram illustrating a specification change example in Example 2;

FIG. 15 is a diagram illustrating a specification change example in a modified example of Example 2;

FIG. 16 is a diagram illustrating a specification change example in a modified example of Example 2;

FIG. 17 is a diagram illustrating a specification change example in a modified example of Example 2;

FIG. 18 is a diagram illustrating a specification change example in a modified example of Example 2;

FIG. 20 is a diagram illustrating a specification change example in Example 3;

FIG. 21 is a diagram illustrating a specification change example in Example 3;

FIG. 22 is a diagram illustrating a specification change example in Example 3;

EMBODIMENTS OF THE INVENTION

Hereinafter, embodiments of the present invention is described with reference to the drawings. The embodiments described below are merely exemplary ones, and embodiments to which the present invention is applied are not limited to the following embodiments. For example, although the embodiment is directed to an LTE system, the present invention is applicable without limitation to the LTE. In addition, in this specification and the claims, the term "LTE" is not limited to a specific release (Rel) of 3 GPP unless otherwise specified. In addition, the "LTE" includes "5G". In addition, in the processing described in the embodiment, the phrases "or less" and "less than" are substantially the same, and any one thereof may be used.

(Overall System Configuration)

Figure 1:
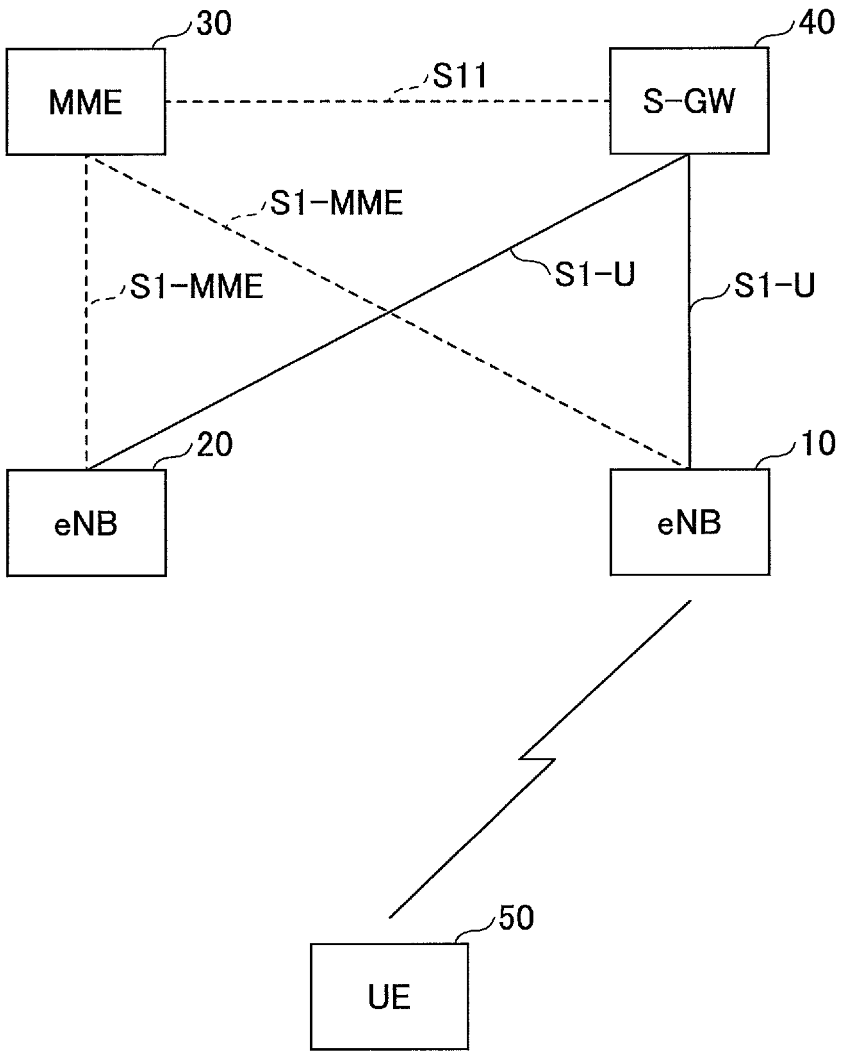
FIG. 1 is a configuration diagram of a communication system according to an embodiment of the present invention.

FIG. 1 is a diagram illustrating a configuration example of a communication system according to an embodiment of the present invention. As illustrated in FIG. 1, the communication system according to the embodiment is configured to include an eNB 10, an eNB 20, an MME 30, a serving gateway (S-GW) 40, and a UE 50.

The UE 50 is user equipment such as a mobile phone. Each of the eNBs 10 and 20 is a base station. The MME 30 is a node device that accommodates an eNB and performs mobility control such as location registration, paging, and handover, bearer establishment/deletion, and the like. The S-GW 40 is a node device that relays user data (U-Plane data). In addition, a system including the MME 30 and the S-GW 40 is referred to as a communication control device. Furthermore, the MME 30 and the S-GW 40 may be configured as a single device and may be referred to as a communication control device.

As illustrated in FIG. 1, the MME 30 and the eNBs 10 and 20 are connected through an S1-MME interface, and the S-GW 40 and the eNBs 10 and 20 are connected through an S1-U interface. Dotted connection lines indicate control signal interfaces, and solid connection lines indicate user data transfer interfaces.

The technique according to the present invention can be applied without limitation to the random access at the time of connection resumption in the above-described UE context retention method. However, in the embodiment, as one application example of the present invention, the UE context retention method is used.

In the embodiment, as an example of the UE context retention method, described are a method (context retention method 1) of defining a new RRC state referred to as an RRC-suspended (and ECM-Suspended) state which is a method described in Non-Patent Document 3 and a method (context retention method 2) of reusing the UE context without defining a new RRC state. Examples of these sequences are be described later.

(Random Access Procedure)

In the embodiment, since a random access procedure between user equipment (referred to as UE) and a base station eNB (referred to as eNB) is used, first, a basic process of the random access procedure is described.

The random access (hereinafter, referred to as RA) is performed in a case where the UE establishes connection with the eNB at the time of originating an outgoing call or the like, and the main purpose thereof is to establish uplink synchronization. As described above, the RA procedure includes a contention type RA procedure and a non-contention type RA procedure. The contention type RA procedure can be used for all purposes, and the non-contention type RA procedure is used for specific purposes such as handover. In the embodiment, the contention type RA procedure is used.

The contention type RA procedure is described with reference to FIG. 2. The UE transmits RA preamble (selected sequence) by a Physical Random Access Channel (PRACH) by using one sequence among a predetermined number of RA preambles (sequences) (step S1). Contention will not occur unless there are other UEs performing random access by using the same sequence at the same time.

In step S2, the eNB transmits, to the UE, an RA response including a TA (timing advance) command for adjusting transmission timing of the UE, an index of the detected RA preamble, uplink resource allocation information (UL grant), and the like by using a downlink shared channel (DL-SCH).

The UE that has received the RA response adjusts uplink timing and transmits a control message such as an RRC connection request to the eNB through a CCCH by using the allocated resources (step S3).

In a case where the UE that has transmitted the RA preamble fails to receive the RA response (in a case where the random access attempt fails), the UE increases transmission power by a predetermined step size every time the random access attempt fails and transmits the PRACH. Such operations are referred to as power ramping.

In step S4, the eNB transmits a contention resolution message. The UE that has received the contention resolution completes the random access process by confirming that its own ID (for example, TC-RNTI, which is used for scrambling in step S3) is included, and after that, the UE performs data transmission and reception.

(Sequence Example of Context Retention Method)

Next, as an operation example of the system in the embodiment, operations according to the above-described context retention method are described. Hereinafter, the context retention method 1 and the context retention method 2 is described.

<Context Retention Method 1>

First, the context retention method 1 is described. In the context retention method 1, in addition to the RRC idle state and RRC-connected state in the related art, a state referred to as an RRC-suspended state is added. In the RRC suspended state, each of the UE and the eNB retains the UE context used for the connection in the RRC connected state before entering the RRC suspended state. Then, in the case of transitioning from the RRC suspended state to the RRC connected state, the RRC connection is established by using the retained UE context.

Figure 3:
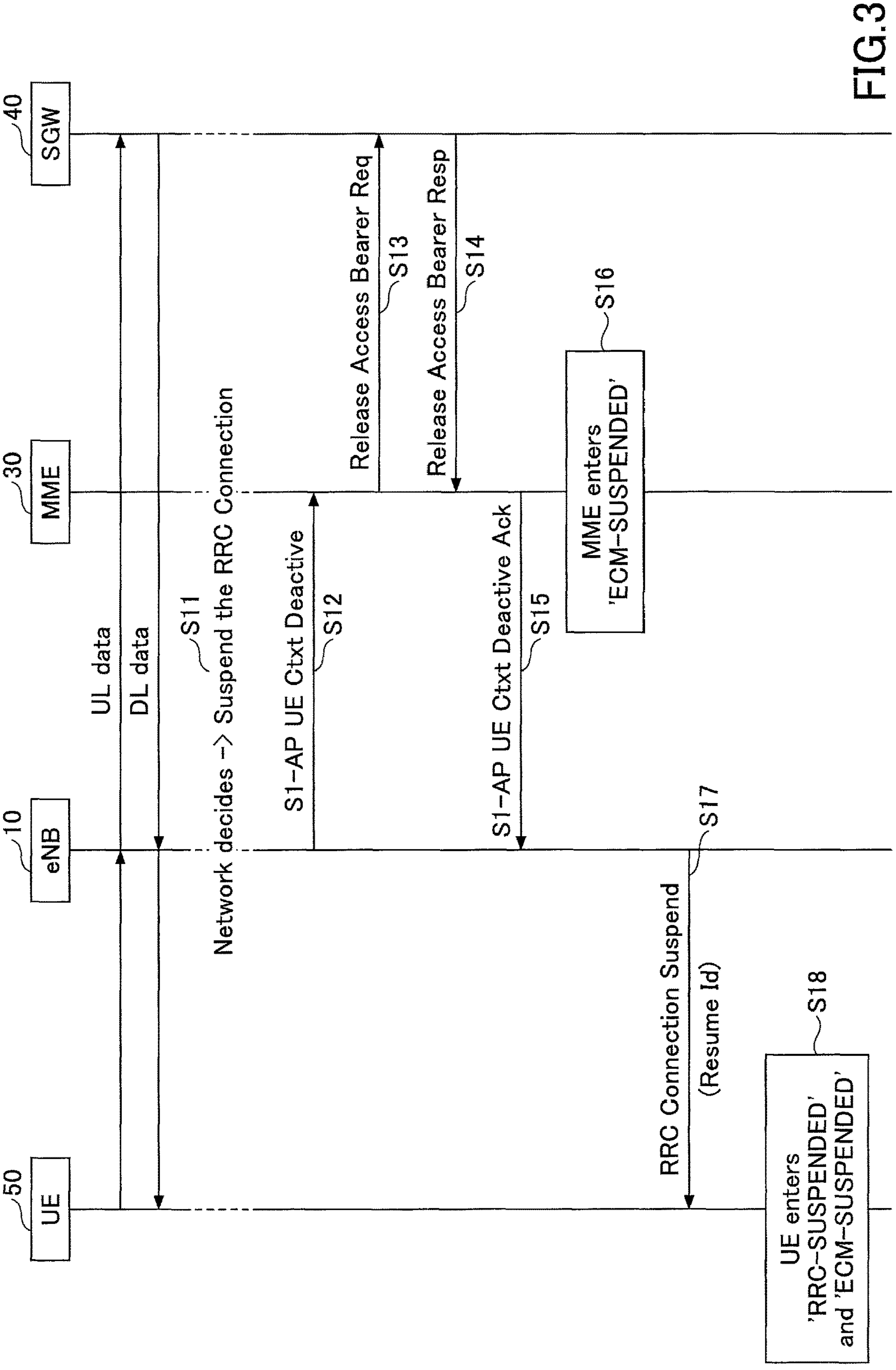
FIG. 3 is a diagram illustrating a processing sequence of a context retention method example 1.

First, as a sequence example of the whole communication system in the context retention method 1, a processing sequence is described when the UE 50 transitions from the RRC idle state to the RRC suspended state (and the ECM suspended state) with reference to FIG. 3.

In step S11, the eNB 10 decides to suspend the RRC connection. In step S12, the eNB 10 transmits, to the MME 30, a message indicating that the RRC connection of the UE 50 is suspended. The MME 30 and the eNB 10 retain the UE context.

Through the messages in steps S13 and S14, in step S15, the MME 30 returns Ack for step S12. In step S16, the MME 30 enters the ECM-suspended state.

In step S17, the eNB 10 transmits an RRC connection suspend message to the UE 50 to allow the UE 50 to be in the RRC suspended state (step S18). The RRC connection suspend message includes a Resume ID. The Resume ID is an identifier used for the case of resuming the RRC connection next time. In the RRC suspended state, each of the UE 50 and the eNB 10 store the UE context.

Herein, in the embodiment, the UE context retained in each of the UE 50 and the eNB 10 includes, for example, an RRC configuration, a bearer configuration (including RoHC state information or the like), an AS security context (Access Stratum security context), L2/L1 parameters (MAC, PHY configuration, or the like), and the like.

Each of the UE 50 and the eNB 10 retains the above information as the UE context, so that when the UE transitions from the RRC suspended state to the RRC connected state, RRC connection can be established without performing transmission and reception of messages such as the RRC connection setup complete, the RRC Security Mode Command, the RRC Security Mode Complete, the RRC Connection Reconfiguration, and RRC Connection Reconfiguration Complete.

Figure 4:
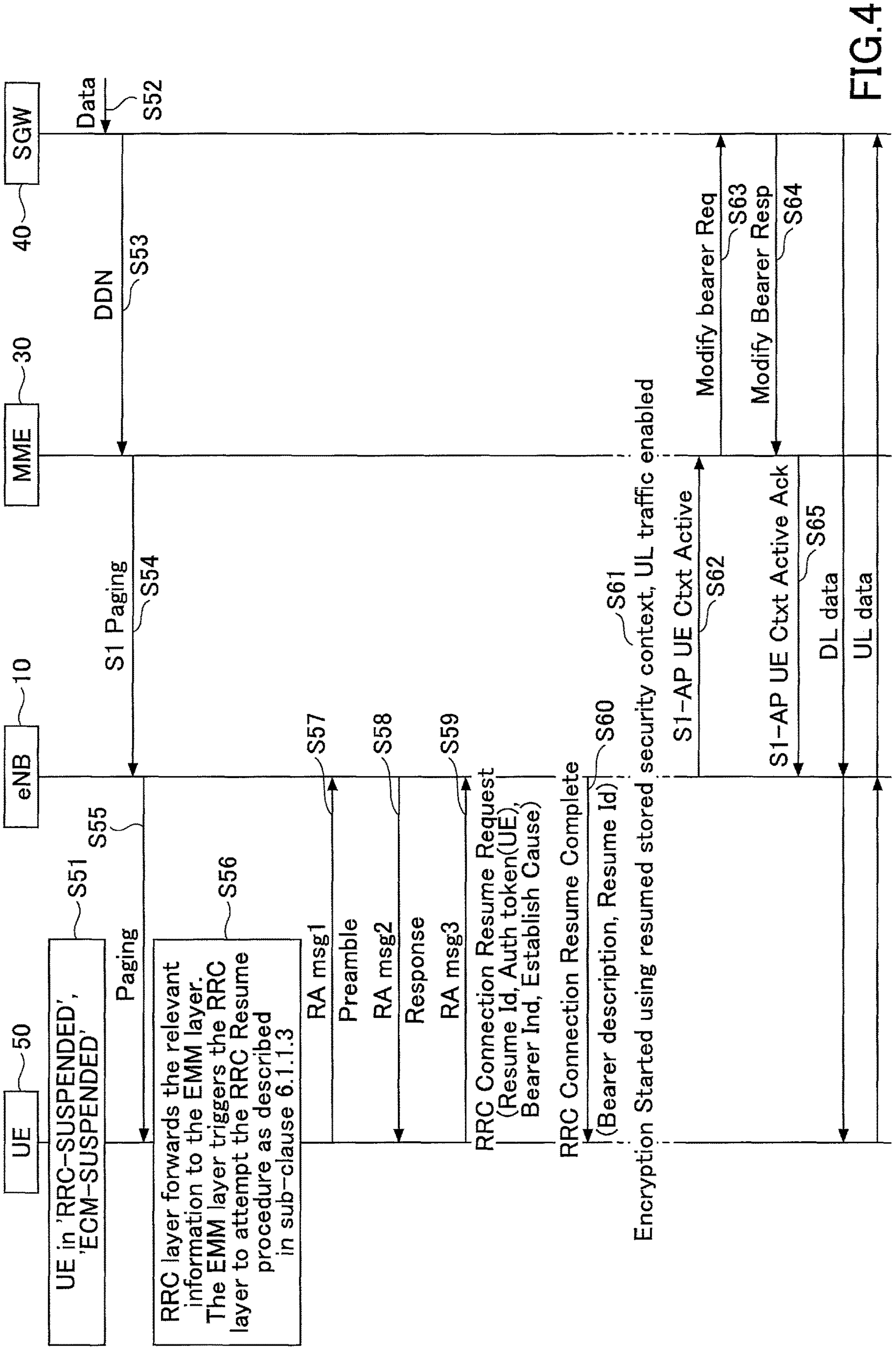
FIG. 4 is a diagram illustrating a processing sequence of a context retention method example 1.

Next, a sequence example in a case where the UE 50 transitions from the RRC suspended state to the RRC connected state is described with reference to FIG. 4. FIG. 4 illustrates a case where the UE 50 in the RRC suspended state (step S51) receives an incoming call (steps S52 to S55). However, this is an example, and even in a case where the UE 50 in the RRC suspended state originates an outgoing call, similar processing for the reuse of the UE context is performed.

In the UE that has received the paging from the eNB 10, in step S56, an RRC resume procedure is activated from the EMM layer. In step S57, a random access preamble is transmitted from the UE 50 to the eNB 10, and in Step S58, a random access response is returned from the eNB 10 to the UE 50.

In step S59, as Message 3, the UE 50 transmits an RRC connection resume request message to the eNB 10.

The RRC connection resume request message includes Resume Id, authentication information, and the like, which is information indicating that the UE 50 retains the UE context. The eNB 10 that has received the RRC connection resume request message acquires the UE context of the UE 50 stored in association with the Resume Id included in the message and resumes the bearer on the basis of the information of the UE context. In step S60, the eNB 10 transmits an RRC connection resume complete message including the Resume Id to the UE 50.

In step S61, the UE 50 and the eNB 10 resume the stored security context. Then, in steps S62 to S65, notification or the like of the state change of the UE 50 to the MME 30 is performed.

<Context Retention Method 2>

Next, the context retention method 2 is described. As described above, the context retention method 2 is a method capable of reducing the number of times of signaling by the UE and the eNB retaining the UE context in the RRC idle state and reusing the retained UE context when transitioning to the RRC connected state without defining a new state such as an RRC-suspended state.

As a sequence example of the whole communication system in the context retention method 2, a method is described, which is for performing paging from the MME 30 upon detecting that there is an incoming call to the UE 50 in the RRC idle state. More specifically, with reference to FIG. 5, the processing sequence is described when the UE 50 connected to the eNB 10 transitions to the RRC connected state, transitions to the RRC idle state in a cell under control of the eNB 10, and then receives an incoming call in the same cell.

Figure 5:
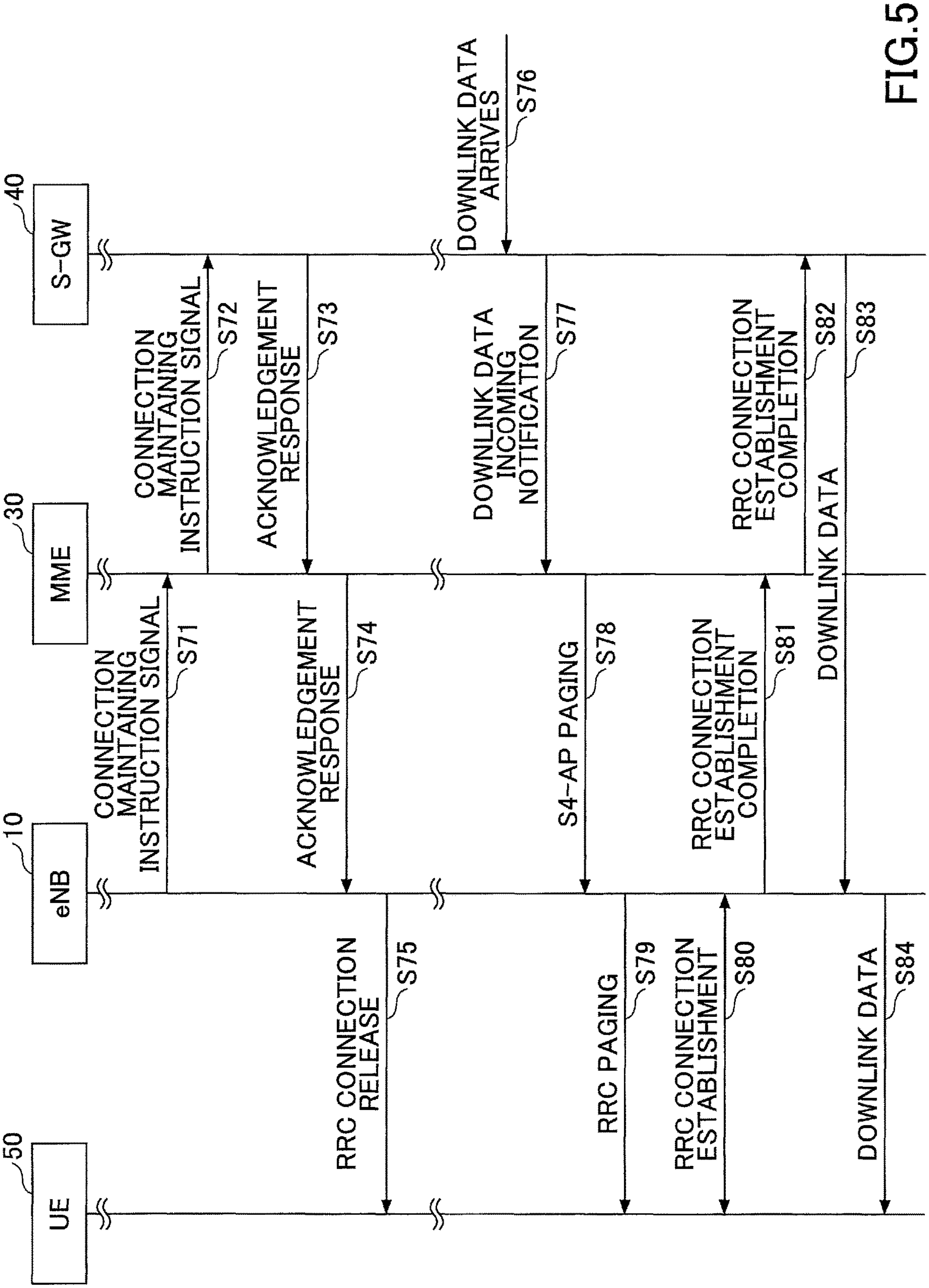
FIG. 5 is a diagram illustrating a processing sequence of a context retention method example 2.

As an assumption of the processing in FIG. 5, the UE 50 is in the RRC connected state in the cell of the eNB 10, and the connection of the S1-C/U to the UE 50 is established. In FIG. 5, the S1-C connection includes connection between the eNB 10 and the MME 30 and connection between the MME 30 and the S-GW 40, and the S1-U connection includes connection between the eNB 10 and the S-GW 40. In a case where connection is established, a signal (data) associated with the UE 50 can be transmitted and received between the corresponding node devices without executing a procedure for connection setup such as a connection establishment signal.

Before entering the description of the procedure of FIG. 5, an outline of an example of a procedure is described when the UE 50 first connects to the eNB 10. The procedure associated with the initial connection can also be applied to the context retention method 1. At the time of performing random access to the UE 50, the eNB 10 transmits an RRC connection setup signal to the UE 50, allows the UE 50 to be in the RRC connected state, and receives an RRC connection setup complete signal from the UE 50. After that, the eNB 10 receives an initial context setup request from the MME 30, transmits an RRC security mode command to the UE 50, receives an RRC security mode complete signal from the UE 50, transmits an RRC connection reconfiguration signal to the UE 50, receives an RRC connection reconfiguration complete signal from the UE 50, and transmits an initial context setup response to the MME 30. Through such a procedure, the establishment, retention, and the like of the UE context in the UE 50 and the eNB 10 are performed.

As illustrated in FIG. 5, in the RRC connected state, the eNB 10 transmits a connection maintaining instruction signal to the MME 30 (step S71). In addition, the MME 30 transmits the connection maintaining instruction signal to the S-GW 40 (step S72).

The connection maintaining instruction signal is a signal instructing to retain the downlink data in the S-GW 40 at the time of originating an incoming call to the UE 50 while maintaining the S1-C/U connection associated with the UE 50 and to perform paging from the MME 30.

The S-GW 40 that has received the connection maintaining instruction signal transmits, to the MME 30, an acknowledgement response indicating that receipt of the instruction is acknowledged (step S73), and the MME 30 transmits the acknowledgement response to the eNB 10 (step S74).

The transmission of the connection maintaining instruction signal from the eNB 10 to the MME 30 with respect to the UE 50 may be performed by using, for example, occurrence of an event allowing the UE 50 to transition to the RRC idle state in the eNB 10 as a trigger or may be performed immediately after the UE 50 is first in the RRC connection state under the control of the eNB 10, and thus, the S1-C/U connection to the UE 50 is established.

The event of transitioning to the RRC idle state is, for example, a case where it is detected that communication (uplink-and-downlink user data communication) with the UE 50 does not occur for a certain period of time due to the expiration of a predetermined timer (for example, a UE Inactivity Timer), but the event is not limited thereto.

In FIG. 5, assumed is a case where the detection that the communication with the UE 50 (uplink-and-downlink user data communication) does not occur for a certain period of time is used as a trigger, and after steps S71 to S74, an RRC connection release message is transmitted to the UE 50, and thus, the UE 50 is allowed to transition to the RRC idle state (step S75). Even in a case where the UE 50 transitions to the RRC idle state, the UE context established at the time of RRC connection is retained in each of the UE 50 and the eNB 10.

After that, a downlink data directed to the UE 50 is generated, and the downlink data arrives at the S-GW 40 (step S76). Herein, although the S1-U connection has been established, the S-GW 40 retains the downlink data in the buffer without transmitting the downlink data to the eNB 10 on the basis of the connection maintaining instruction signal received in step S72.

The S-GW 40 transmits a downlink data incoming notification to the MME 30 (step S77), and the MME 30 transmits an S1-AP paging signal directed to the UE 50 to the eNB 10 (step S78). This paging itself is similar to the existing paging and is transmitted to each eNB in a tracking area of the UE 50, but in FIG. 5, the paging indicates the transmission to the eNB 10.

The eNB 10 that has received the S1-AP paging signal transmits an RRC paging signal to the UE 50 under the control thereof (step S79).

The UE 50 that has received the RRC paging signal performs an RRC connection establishment procedure to establish an RRC connection (step S80). After that, the eNB 10 transmits, to the MME 30, an RRC connection establishment completion signal, which is a signal indicating that the RRC connection establishment is completed (step S81).

The MME 30 transmits the RRC connection establishment completion signal to the S-GW 40 (step S82). As a result, the S-GW 40 determines that the RRC connection between the UE 50 and the eNB 10 has been established and starts transmitting the retained downlink data to the eNB 10 by using the established S1-U connection associated with the UE (Step S83). The downlink data arrives from the eNB 10 to the UE 50 (step S84). By doing so, the transmission of the downlink data to the UE 50 is started.

In the RRC connection establishment procedure of step S80 of FIG. 5, since the UE context retained by each of the UE 50 and the eNB 10 is used, the RRC connection establishment can be performed without transmitting/receiving messages such as an RRC Security Mode Command message, an RRC Security Mode Complete message, an RRC Connection Reconfiguration message, and an RRC Connection Reconfiguration Complete message.

Hereinafter, Examples 1 to 4 are described as methods for solving the problem in the above-described random access procedure. Namely, Examples 1 to 4 are described as examples of methods for preventing the UE from being unable to transmit due to shortage of TBS even in a case where the UE intends to transmit Message 3. The overall random access procedure in each of the following Examples is the procedure as illustrated in FIG. 2. In addition, in the following description, user equipment is referred to as a UE, and a base station is referred to as an eNB.

Example 1

First, Example 1 is described. In Example 1, when the UE is to select an RA preamble group from the RA preamble groups A and B in the random access procedure, even in a case where the UE does not satisfy the condition for selecting an existing RA preamble group B, if the size of the CCCH SDU (size added with the MAC header) is larger than messageSizeGroupA, the UE selects the RA preamble group B, selects the RA preamble from from the RA preamble group B, and transmits the RA preamble.

The above procedure is performed in a case where the RA preamble group B exists. Namely, the UE receives the SIB2 message (or the RRC dedicated message) from the eNB, and if sizeOfRA-PreamblesGroupA (the number of preambles of the GroupA) in the RACH-ConfigCommon in the message is not equal to numberOfRA-Preambles (the total number of preambles), the UE determines that the RA preamble group B exists. The messageSizeGroupA is a parameter in the RACH-ConfigCommon and is a threshold value to be compared with the message size (the size of Message 3) in the selection determination of the RA preamble groups A and B.

FIG. 6 illustrates a description example (excerpt) of the specification (3 GPP TS 36.321) corresponding to the operation of the UE of Example 1. In FIG. 6, the changed portions from Non-Patent Document 2 are underlined.

As illustrated in FIG. 6, in the determination condition for selecting any one of the RA preamble groups A and B, the condition that the CCCH SDU size is larger than messageSizeGroupA is added to the condition for determining the RA preamble group B through OR.

Figure 2:
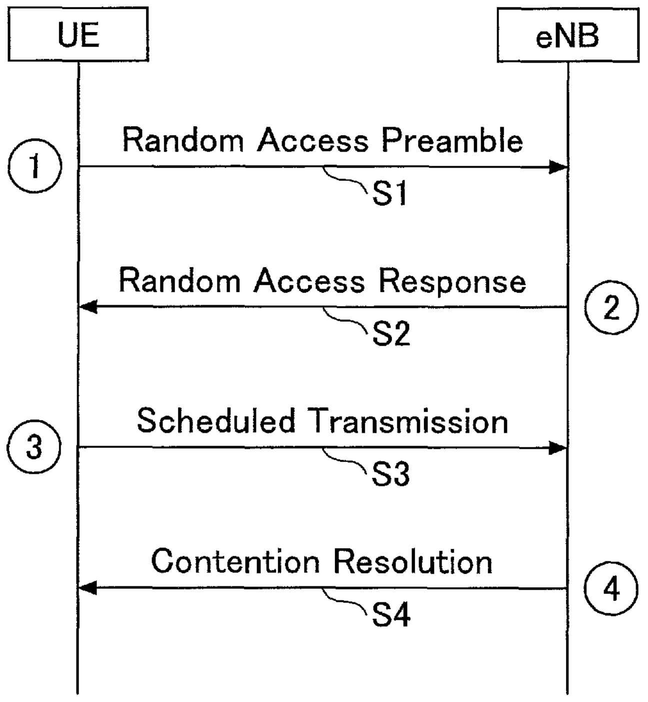
FIG. 2 is a diagram illustrating a random access procedure.

Namely, before performing step S1 illustrated in FIG. 2, first, the UE according to Example 1 in accordance with this specification determines whether or not the RA preamble group B exists. In a case where the RA preamble group B exists, the UE performs the following processing.

First, the UE determines whether or not the size of a message (UL data+MAC header, +MAC CE if necessary) to be transmitted as Message 3 is larger than the messageSizeGroupA and determines whether or not the path loss is equal to or smaller than a predetermined value. If the determination result is Yes, the UE selects the RA preamble group B.

In addition, the UE determines whether the CCCH SDU size (size as the MAC PDU) is larger than the messageSizeGroupA. If the determination result is Yes, the UE selects the RA preamble group B. In addition, the CCCH SDU size in the embodiment (Examples 1 to 4) denotes the size added with the MAC header even in a case where it is not explicitly stated that the CCCH SDU size is the size added with the MAC header. However, instead of the size added with the MAC header, the size of the CCCH SDU not including the MAC header may be used.

If any of the above determination results is No, the UE selects the RA preamble group A.

Then, the UE randomly selects one RA preamble from RA preambles within the selected group and transmits the RA preamble to the eNB (step S1 of FIG. 2).

In the eNB, for example, if it is determined that the RA preamble in the RA preamble group B has been received, a larger TBS than the case of receiving the RA preamble in the RA preamble group A is allocated as the UL resource, and an RA response including the UL grant is transmitted to the UE (Step S2 of FIG. 2). Therefore, the UE can transmit Message 3 which is, for example, larger than 56 bits to the eNB.

FIG. 7 illustrates another example of the description (excerpt) of the specification (3 GPP TS 36.321) corresponding to the operation of the UE of Example 1. The example illustrated in FIG. 7 is an example where it is explicitly described that the size to be compared with messageSizeGroupA is the size of “CCCH SDU size+MAC header”. Namely, the UE executing the operation of the specification determines whether or not “the random access procedure is started for the CCCH logical channel and the “CCCH SDU size+MAC header” is larger than messageSizeGroupA”. If the determination result is Yes, the UE selects the RA preamble group B. The other portions except for this portion are the same as those in FIG. 6. In addition, the expression “the random access procedure is started for the CCCH logical channel” denotes that the random access procedure is started (initiated) for transmission of, for example, an RRCConnectionRequest message, an RRCConnectionReestablishmentRequest message, an RRC connection resume message, or the like.

In addition, in Example 1, the value of messageSizeGroupA to be notified from the eNB to the UE is not limited to a specific value. However, the value is, for example, 56 bits.

Example 1 is particularly appropriate to a case where only one additional CCCH SDU size is defined in addition to the current 56-bit TBS. However, even in a case where two or more additional CCCH SDU sizes are defined, the technique of Example 1 can be used.

Example 2

Next, Example 2 is described. In Example 2, a new RA preamble group is provided for a newly added CCCH SDU size. For example, in a case where only one CCCH SDU size is added, a Group C is newly added. Namely, in this case, a plurality of preambles (for example, 64 preambles, values notified by the numberOfRA-Preambles of the RACH-ConfigCommon) which can be randomly selected by the UE can be divided into three groups (Group C, Group B, Group C).

An operation example of the RA preamble selection performed by the UE in Example 2 (operation immediately before step S1 of FIG. 2) is described with reference to a flowchart of FIG. 8. As a premise of this flowchart, it is assumed that the UE receives an SIB2 message (or an RRC dedicated message) and acquires and retains each parameter such as the threshold value or the like according to the RACH-ConfigCommon in the message. In addition, it is assumed that the UE grasps on the basis of parameters that the Group C and the Group B exist. In addition, the later-described “message size of the Group C” is one of the parameters notified from the eNB to the UE.

For example, in a case where the UE intends to transmit the message for the above-described connection resumption to the eNB as Message 3, the UE starts a random access procedure.

In step S101, for example, the UE grasps that the RA preamble is not explicitly signaled from the eNB and starts RA preamble selection processing through the MAC layer.

In step S102, the UE determines whether or not the message size (CCCH SDU+MAC header) to be transmitted is equal to the message size of the Group C. If the determination result is Yes, the process proceeds to step S104. The Group C is selected, and the RA preamble is selected from the Group C.

If the determination result in step S102 is No, the process proceeds to step S103. In step S103, the UE determines whether or not the Potential message size (UL data+MAC header, if necessary+MAC CE) is larger than the message size of the Group C and the path loss is equal to or smaller than a predetermined value. If the determination result is Yes, the process proceeds to step S105. The Group B is selected, and the RA preamble is selected from the Group B. The Potential message size is the size of the message scheduled to be transmitted as Message 3.

If the determination result in step S103 is No, the process proceeds to step S106. The Group A is selected, and the RA preamble is selected from the Group A.

For example, if the size of the new CCCH SDU+MAC header is 64 bits, in a case where the eNB receives the RA preamble of the group C from the UE, the eNB allocates a 64-bit TBS to the UE. In addition, in this case, in a case where the eNB receives the RA Preamble of the Group B from the UE, the eNB allocates a TBS (for example, 80 bits) larger than 64 bits to the UE. In addition, in a case where the eNB receives the RA preamble of the Group A from the UE, the eNB allocates a TBS (for example, 56 bits) smaller than 64 bits to the UE.

FIG. 9 illustrates a description example (excerpt) of the specification (3 GPP TS 36.321, 5.1.1) corresponding to the operation of the UE of Example 2. In FIG. 9, the changed portions from Non-Patent Document 2 are underlined.

As illustrated in FIG. 9, it is defined that the preambles included in the RA Preambles group A, the RA Preambles group B, and the RA Preambles group C are calculated from the parameters of numberOfRA-Preambles, sizeOfRA-PreamblesGroupA, and sizeOfRA-PreamblesGroupC. In addition, in a case where the RA Preambles Group C exists, it is defined that the preambles of the RA Preamble Group C range from the sizeOfRA-PreamblesGroupA to the numberOfRA-PreamblesC−1, and the preambles of the RA Preamble Group B range from the sizeOfRA-PreamblesGroupC to the numberOfRA-Preambles−1.

FIG. 10 illustrates a description example (excerpt) of the specification (3 GPP TS 36.321, 5.1.2) corresponding to the operation of the UE of Example 2. In FIG. 10, the changed portions from Non-Patent Document 2 are underlined.

Figure 8:
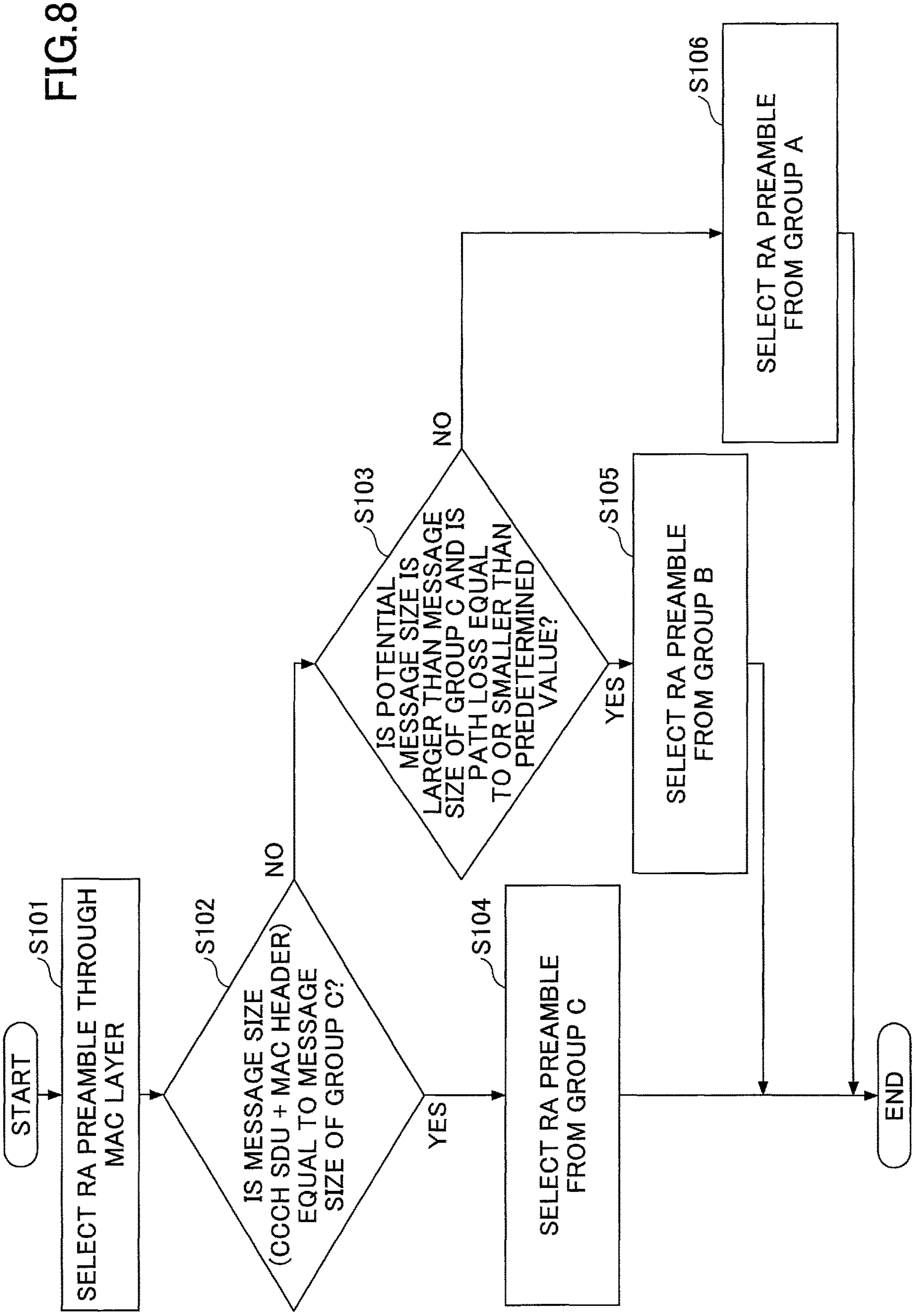
FIG. 8 is a flowchart illustrating a processing procedure in Example 2.

The description example illustrated in FIG. 10 corresponds to the contents of the flowchart illustrated in FIG. 8. As illustrated in FIG. 10, in a case where the Group C does not exist, similarly to the related art, the Group B is selected such that the potential message size is equal to or larger than the message size of the Group A and the path loss is equal to or smaller than a predetermined value.

FIGS. 11 and 12 illustrate description examples (excerpts) of the specification (3 GPP TS 36.331) corresponding to the operation of the UE of Example 2. In FIGS. 11 and 12, the changed portions from Non-Patent Document 5 are underlined.

As illustrated in FIG. 11, in the RACH-ConfigCommon information element, parameters such as sizeOfRA-PreamblesGroupC, messageSizeGroupC, and messagePowerOffsetGroupB are added. The MessageSizeGroupC is a threshold value used in determination (message size of the Group C). As illustrated in FIG. 12, the sizeOfRA-PreamblesGroupC is the size of the GroupC (the number of preambles).

In addition, in Example 2, a case where one group is newly added has been described. However, the same processing can be implemented even in a case where two or more groups are newly added. In this case, in the flow of FIG. 8, it is determined for each additional group whether or not the message size (CCCH SDU+MAC header) is equal to the parameter (message size of the Group C or the like).

Modified Example of Example 2

Figure 13:
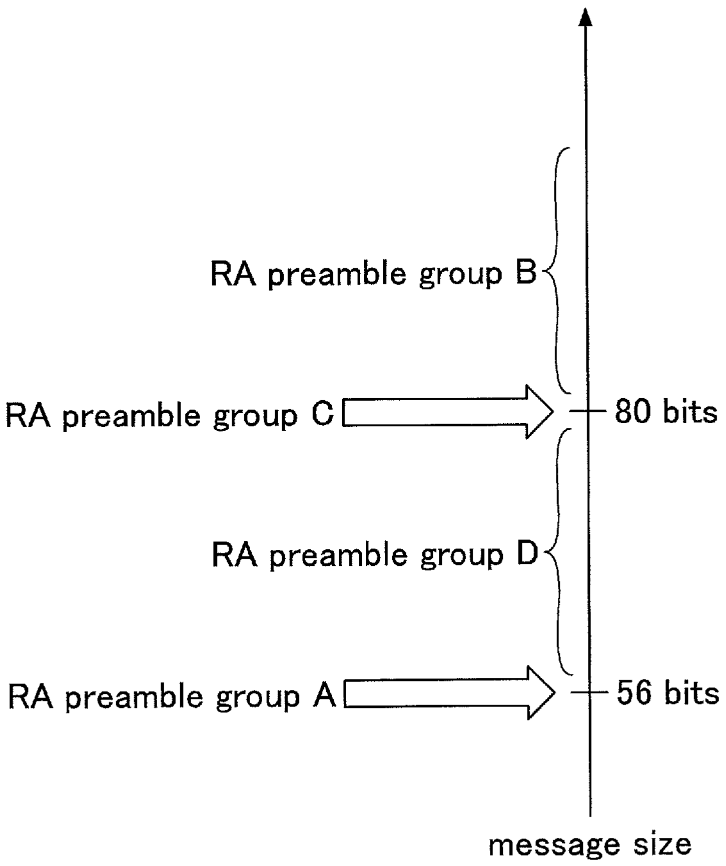
FIG. 13 is a diagram for describing a modified example of Example 2.

Next, a modified example of Example 2 is described. In the modified example of Example 2, four RA preamble groups are provided so as to be divided into five patterns illustrated in FIG. 13. In addition, in this example, the message size of RA preamble group A is set to 56 bits, and the message size of RA preamble group C is set to 80 bits. However, the settings are merely an example. These values are notified from the eNB to the UE as parameters through the RACH-ConfigCommon. In this example, a plurality of preambles which can be randomly selected by the UE are divided into four groups (Group D, Group C, Group B, and Group C).

Figure 14:
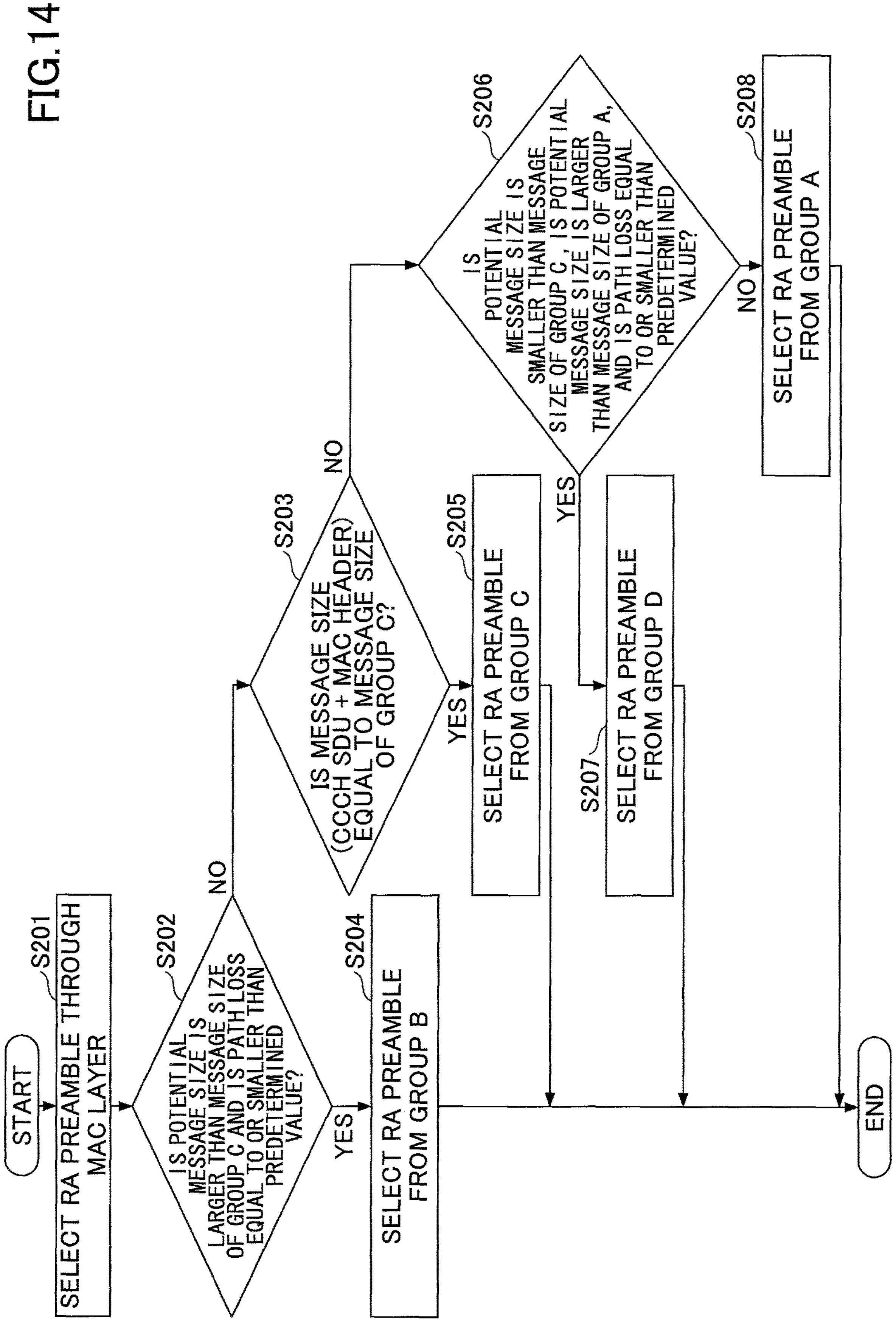
FIG. 14 is a flowchart illustrating a processing procedure in a modified example of Example 2.

An operation example is described which is for selecting the RA preamble for the UE in the modified example 2 (operation immediately before step S1 of FIG. 2), with reference to a flowchart of FIG. 14. As a premise of this flowchart, it is assumed that the UE receives an SIB2 message (or an RRC dedicated message) and acquires and retains each parameter such as the threshold value or the like according to the RACH-ConfigCommon in the message. In addition, it is assumed that the UE grasps on the basis of parameters that the Group C and the Group B exist.

For example, in a case where the UE intends to transmit the message for the later-described connection resumption to the eNB as Message 3, the UE starts a random access procedure.

In step S201, for example, the UE grasps that the RA preamble is not explicitly signaled from the eNB and starts RA preamble selection processing through the MAC layer.

In step S202, the UE determines whether or not the Potential message size (UL data+MAC header, if necessary+MAC CE) is larger than the message size of the Group C and the path loss is equal to or smaller than a predetermined value. If the determination result is Yes, the process proceeds to step S204. The Group B is selected, and the RA preamble is selected from the Group B.

If the determination result in step S202 is No, the process proceeds to step S203. In step S203, the UE determines whether or not the message size (CCCH SDU+MAC header) of Message 3 to be transmitted is equal to the message size (for example, 80 bits) of the Group C. If the determination result is Yes, the process proceeds to step S205. The Group C is selected, and the RA preamble is selected from the Group C.

If the determination result in step S203 is No, the process proceeds to step S206. In step S206, the UE determines whether or not the "Potential message size (UL data+MAC header, if necessary+MAC CE) is smaller than the message size of the Group C and the Potential message size (UL data+MAC header, +MAC CE) is larger than Group A's message size (for example, 56 bits) and the path loss is equal to or smaller than a predetermined value. If the determination result is Yes, the process proceeds to step S207. The group D is selected, and the RA preamble is selected from the group D. If the determination result is No, the process proceeds to step S208. The Group A is selected, and the RA preamble is selected from the Group A.

For example, it is considered that, if the size of the new CCCH SDU+MAC header is set to be 80 bits and the existing message size (Group A) is set to be 56 bits, in a case where the eNB receives the RA preamble of the Group C from the UE, the eNB allocates an 80-bit TBS to the UE. In addition, in a case where the eNB receives the RA preamble of the Group B from the UE, the eNB allocates a TBS larger than 80 bits to the UE. In addition, in a case where the eNB receives the RA preamble of the Group A from the UE, the eNB allocates a 56-bit TBS to the UE. In addition, in a case where the eNB receives the RA preamble of the Group D from the UE, the eNB allocates a TBS (for example, 64 bits) larger than 56 bits and smaller than 80 bits to the UE.

FIG. 15 illustrates a description example (excerpt) of the specification (3 GPP TS 36.321, 5.1.1) corresponding to the operation of the UE of the modified example of Example 2. In FIG. 15, the changed portions from Non-Patent Document 2 are underlined.

As illustrated in FIG. 15, it is defined that the preambles included in RA Preambles group A, the RA Preambles group B, the RA Preambles group C, and the RA Preambles group D are calculated from the parameters of numberOfRA-Preambles, sizeOfRA-PreamblesGroupA, and sizeOfRA-PreamblesGroupC. In addition, in a case where the RA Preambles Group C and the RA Preambles Group D exist, it is defined that the preambles of RA Preamble Group C range from the sizeOfRA-PreamblesGroupA to the numberOfRA-PreamblesC−1, the preambles of the RA Preamble Group D range from the sizeOfRA-PreamblesGroupC to the numberOfRA-PreamblesD−1, and the preambles of the RA Preamble Group B range from the sizeOfRA-Preambles-GroupD to the numberOfRA-Preambles−1.

FIG. 16 illustrates a description example (excerpt) of the specification (3 GPP TS 36.321, 5.1.2) corresponding to the operation of the UE of the modified example of Example 2. In FIG. 16, the changed portions from Non-Patent Document 2 are underlined.

The description example illustrated in FIG. 16 corresponds to the contents of the flowchart illustrated in FIG. 14. As illustrated in FIG. 16, in a case where the Group C does not exist, similarly to the related art, the Group B is selected such that the potential message size is equal to or larger than the message size of the Group A and the path loss is equal to or smaller than a predetermined value.

FIGS. 17 and 18 illustrate descriptions (excerpts) of the specification (3 GPP TS 36.331) corresponding to the operation of the UE of the modified example of Example 2. In FIGS. 17 and 18, the changed portions from Non-Patent Document 5 are underlined.

As illustrated in FIG. 17, in the RACH-ConfigCommon information element, parameters such as sizeOfRA-PreamblesGroupC, messageSizeGroupC, messagePowerOffsetGroupB, and sizeOfRA-PreamblesGroupD are added. The MessageSizeGroupC is a threshold value used in determination (message size of the Group C). As illustrated in FIG. 18, the sizeOfRA-PreamblesGroupC is the size of the GroupC (the number of preambles).

In the modified example of Example 2, a case where two groups are newly added has been described as an example. However, the same processing can be implemented even in a case where three or more groups are newly added.

Example 3

Next, Example 3 is described. In Example 3, 64 RA preamble resources (PRACH resources) different for each CCCH SDU size are prepared. The number 64 is an example. The UE can determine the number on the basis of system information from the eNB or RRC dedicated signaling. In the following description, it is described that the number is 64. In addition, the CCCH SDU size and the RA preamble resource do not need to correspond to each other in a one-to-one correspondence manner. For example, the CCCH SDU size and the RA preamble resource may correspond to each other in a 1-to-N (N is an integer of 2 or more) correspondence manner.

The UE generates an RA preamble series from the Zadoff-chu sequence. The UE can treat the RA preamble series as the above RA preamble resource. In this case, 64 different RA preamble seriess correspond to the sizes of the CCCH SDU. For example, in a case where the UE transmits a 72-bit CCCH SDU message, the UE transmits an RA preamble series 1 corresponding to 80 bits, and in a case where the UE transmits a 56-bit CCCH SDU message, the UE transmits an RA preamble series 2 corresponding to 56 bits.

In addition, for example, the RA preamble series may be set to be the same irrespective of the CCCH SDU size, and the frequency/time resource transmitting the RA preamble series may be associated with the CCCH SDU size. In this case, the frequency/time resource corresponds to the RA preamble resource. In this case, for example, in a case where the UE transmits an 80-bit CCCH SDU message, the UE transmits the RA preamble through a frequency/time resource 1 corresponding to 80 bits, and in a case where the UE transmits a 56-bit CCCH SDU message, the UE transmits the RA preamble through a frequency/time resource 2 corresponding to 56 bits.

Information on a correspondence relationship between the CCCH SDU size and the RA preamble resource is notified from the eNB to the UE by using system information or RRC dedicated signaling. The UE retains the information on the correspondence relationship and decides the RA preamble resource on the basis of the correspondence relationship and the CCCH SDU size of Message 3 to be transmitted.

The eNB retains the correspondence relationship between the CCCH SDU size and the RA preamble resource and can grasp the CCCH SDU size that the UE is to transmit through Message 3 on the basis of the RA preamble resource received from the UE. Therefore, the eNB can perform TBS allocation according to CCCH SDU size by using the RA response.

Figure 19:
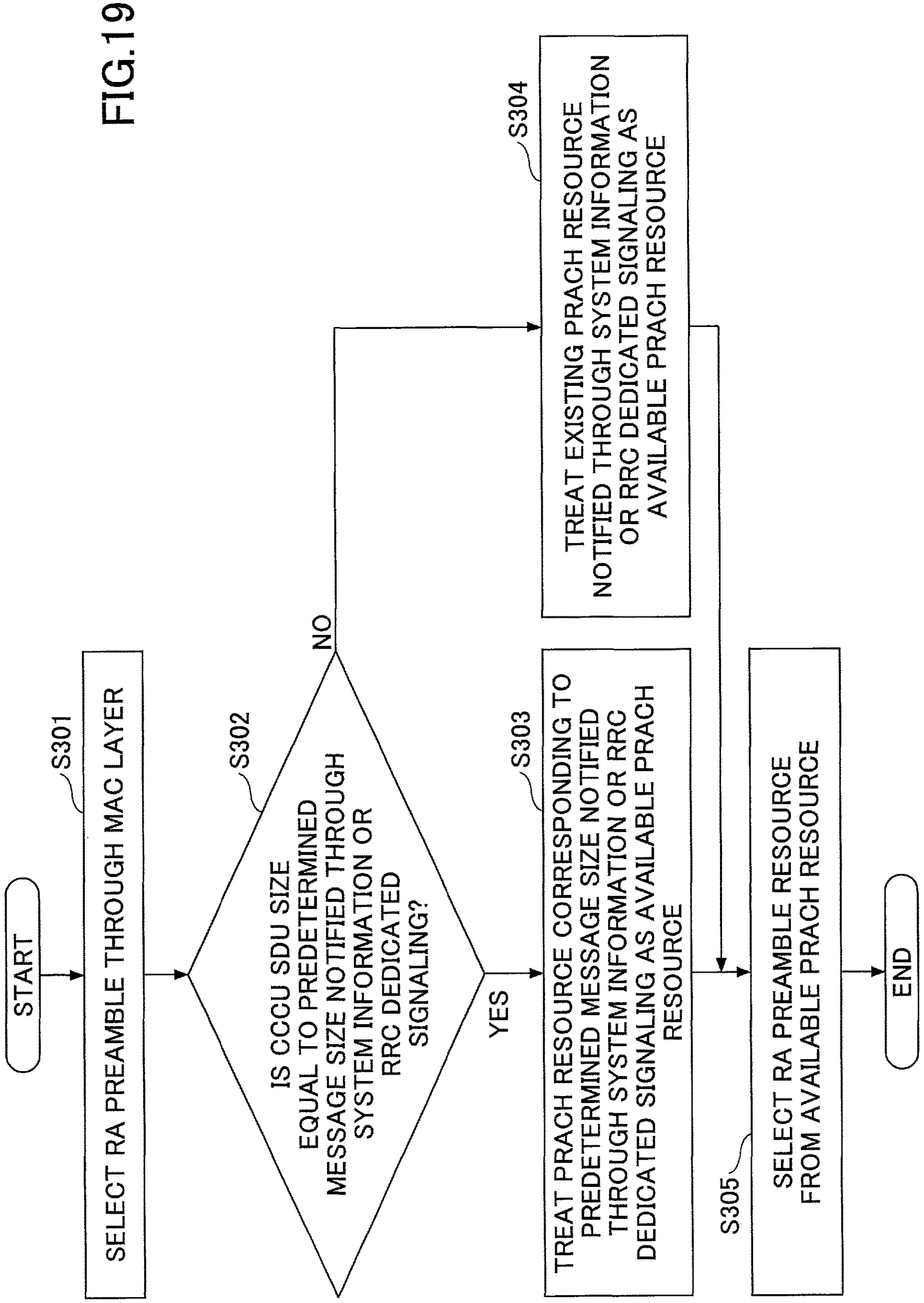
FIG. 19 is a flowchart illustrating a processing procedure in Example 3.

An operation example of the RA preamble selection performed by the UE in Example 3 (operation immediately before step S1 of FIG. 2) is described with reference to a flowchart of FIG. 19. As a premise of this flowchart, it is assumed that the UE acquires and retains the information on the correspondence relationship between the CCCH SDU size and the RA preamble resource from the system information (or the RRC dedicated message) received from the eNB.

For example, in a case where the UE intends to transmit the message for the later-described connection resumption to the eNB as Message 3, the UE starts a random access procedure.

In step S301, for example, the UE grasps that the RA preamble is not explicitly signaled from the eNB and starts RA preamble selection processing through the MAC layer.

In step S302, the UE determines whether or not the CCCH SDU size of Message 3 to be transmitted is equal to a predetermined message size notified through the system information or the RRC dedicated signaling. Namely, it is determined whether or not there is a message size equal to the CCCH SDU size in the list of message sizes in the correspondence relationship notified through the system information or the RRC dedicated signaling.

If the determination result in step S302 is Yes, the process proceeds to step S303, and the UE treats the PRACH resource (generally, there are a plurality of PRACH resources) corresponding to the message size equal to the CCCH SDU size as an available PRACH resource. Then, in step S305, the UE selects a resource of the RA preambles from the available PRACH resources and transmits the RA preamble.

If the determination result in step S302 is No, the process proceeds to step S304 to treat the PRACH resource of the related art notified by using the system information or the RRC dedicated signaling as the available PRACH resource, and the process proceeds to step S305.

FIG. 20 illustrates a description example (excerpt) of the specification (3GPP TS 36.321, 5.1.1) corresponding to the operation of the UE of Example 3. In FIG. 20, the changed portions from Non-Patent Document 2 are underlined.

As illustrated in FIG. 20, the UE starts the RA procedure, and the UE grasps a set of the available PRACH resources associated with the respective message sizes of Message 3. This is indicated by prach-ConfigIndex.

FIG. 21 illustrates a description example (excerpt) of the specification (3GPP TS 36.321, 5.1.2) corresponding to the operation of the UE of Example 3. In FIG. 21, the changed portions from Non-Patent Document 2 are underlined.

As illustrated in FIG. 21, in a case where the CCCH SDU is included in Message 3 and the CCCH SDU size is indicated in the MessageSizeOfMsg3 in the MessageSizePrachInfoList (the list of the predetermined size), the UE treats the resource (PRACH-ParametersMsgSize) corresponding to the size as the available PRACH resources. Otherwise, the UE treats the resource indicated by PRACH-ConfigSIB or PRACH-Config as the available PRACH resources.

FIG. 22 illustrates a description example (excerpt) of the specification (3GPP TS 36.331) corresponding to the operation of the UE of Example 3. In FIG. 22, the changed portions from Non-Patent Document 5 are underlined. As illustrated in FIG. 22, the MessageSizePrachInfoList, the PRACH-ParametersMsgSize, and the like described above are added to PRACH-Config information elements. The information corresponds to the information on the correspondence relationship between the CCCH SDU size and the RA preamble resource described above.

Example 4

Next, Example 4 is described. In Example 4, in a case where the UE resumes the RRC connection (for example, steps S56 to S59 of FIG. 4 and step S80 of FIG. 5), the UE generates a resume request message through the RRC layer (the size larger than that of Message 3 of the related art) and, at the same time, also generates an RRC connection request message (or an RRC Connection reestablishment request message) of Message 3 size (56 bits of TBS) of the related art. Then, the UE transmits both messages to the lower layer.

In the MAC layer, according to the allocated TBS, the UE selects transmission of a resume request message having a size larger than that of Message 3 of the related art or transmits a resume request message having a size of Message 3 size of the related art or transmission of an RRC connection request message (or an RRC Connection reestablishment request message).

For example, in the case of FIG. 4, if the UE starts the RRC connection resumption in step S56, the UE generates an RRC connection resume request message and also generates an RRC connection request message. Then, in the MAC layer, the UE determines whether to transmit either the RRC connection resume request message or the RRC connection request message according to the TBS allocated through the UL grant received in step S58. For example, if the TBS has a size capable of transmitting the RRC connection resume request message, the UE transmits the RRC connection resume request message. In this case, the procedure illustrated in FIG. 4 is performed thereafter. On the other hand, if the TBS does not have a size capable of transmitting the RRC connection resume request message, the UE transmits an RRC connection request message (or an RRC Connection reestablishment request message). In this case, the procedure similar to the procedure for transmitting the RRC connection request message (or RRC Connection reestablishment request message) of the related art is performed thereafter.

Figure 23:
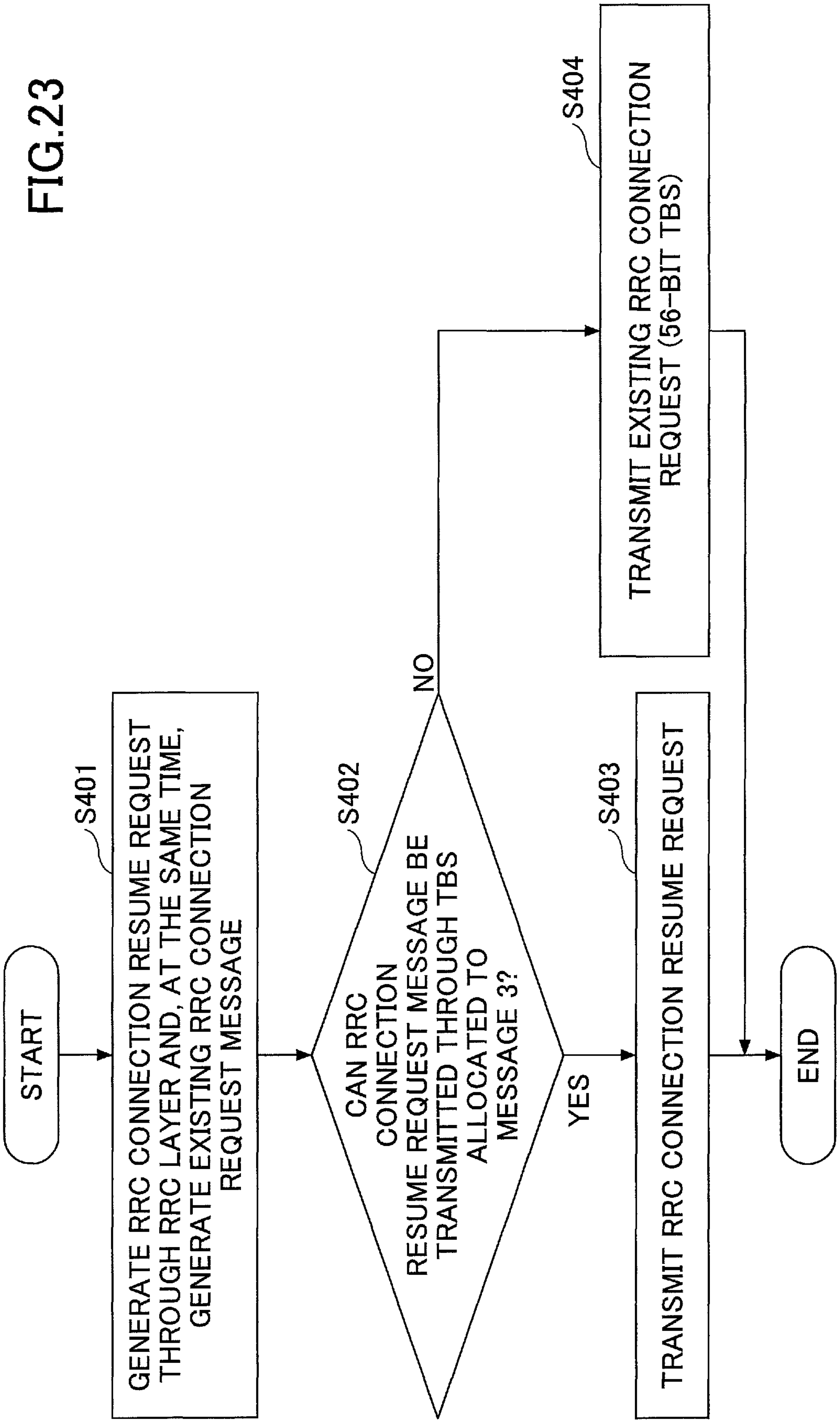
FIG. 23 is a flowchart illustrating a processing procedure in Example 4.

An operation example at the time of the RRC connection resumption performed by the UE in Example 4 is described with reference to a flowchart of FIG. 23. In FIG. 23, the RRC connection resume request message is used as a message for the RRC connection resumption. The message may be considered to be a new message in FIG. 4, or the message may be considered to be an extension of an existing message (for example, a message used in step S80 of FIG. 5).

In step S401, the UE generates the RRC connection resume request message in the RRC layer and, at the same time, also generates the existing RRC connection request message. In step S402, the UE determines whether or not the UE can transmit the RRC connection resume request message through the TBS allocated to Message 3.

If the determination result in step S402 is Yes, the RRC connection resume request message is transmitted in step S403. If the determination result is No, it is assumed that the TBS is 56 bits, and the UE transmits the existing RRC connection request message in step S404.

In Example 4, for example, in a case where the radio quality is good, large TBS allocation can be expected, and thus, in this case, it is possible to transmit an RRC connection resume request message. In addition, even in the case of receiving normal TBS allocation, it is possible to transmit an RRC connection request message. Namely, in the RA procedure, it is possible to prevent the UE from being unable to transmit the control message due to shortage of uplink resources allocated from the eNB.

In Example 4, although the example where the RRC connection request message and the RRC connection resume request message are generated at the same time is disclosed, a processing of generating a plurality of messages having different sizes at the same time and transmitting the message if large message transmission is available is applicable without limitation to the RRC connection request message and the RRC connection resume request message.

All or one or more of Examples 1 to 4 (including the modified example of Example 2, the same hereinafter) can be implemented in combination as long as there is no inconsistency.

(Device Configuration Example)

Next, device configuration examples of the UE and the eNB in the embodiment of the present invention are described, respectively. The configurations of the respective devices described below illustrate only the functional units particularly relating to the embodiment of the invention and also have functions (not illustrated) for operating as a device in at least a communication system in accordance with the LTE. Furthermore, the functional configuration illustrated in each figure is merely an example. As long as the operations according to the embodiment can be executed, any function division or any names of functional units may be available.

Each device may have all the functions of Examples 1 to 4 or may have the functions of any one of Examples 1 to 4, may have the functions of the modified example, or may have a plurality of the functions of any one of Examples 1 to 4. In the following description, it is assumed that each device has the functions of Examples 1 to 4.

<User Equipment UE>

Figure 24:
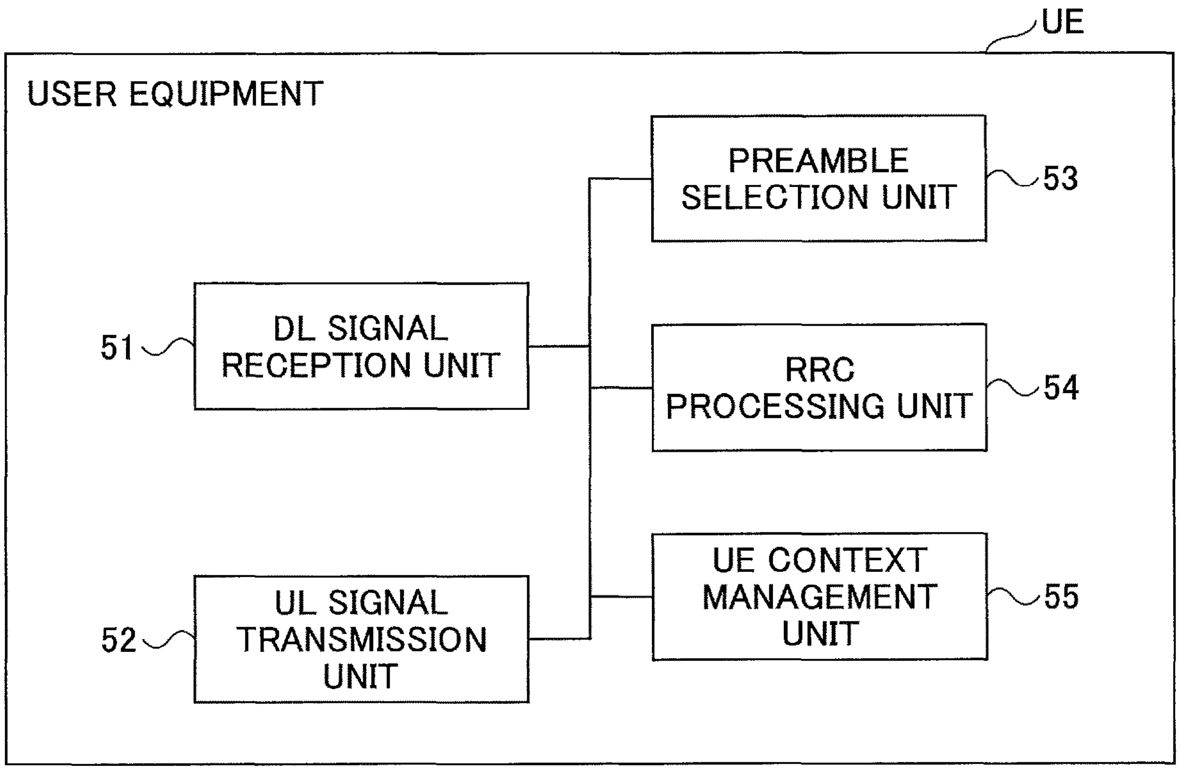
FIG. 24 is a configuration diagram of a UE.

FIG. 24 illustrates a functional configuration diagram of the UE. As illustrated in FIG. 24, the UE is configured to include a DL signal reception unit 51, a UL signal transmission unit 52, a preamble selection unit 53, an RRC processing unit 54, and a UE context management unit 55. In addition, FIG. 24 illustrates only functional units particularly relating to the present invention in the UE, and the UE also has functions (not illustrated) for performing at least the operations in accordance with the LTE.

The DL signal reception unit 51 is configured to include functions of receiving various downlink signals from a base station eNB and acquiring information of a higher layer from signals of a received physical layer. The UL signal transmission unit 52 is configured to include functions of generating various signals of the physical layer from the information of the higher layer to be transmitted from the UE 50 and transmitting the signals to the base station eNB.

The preamble selection unit 53 selects the preamble through the MAC layer by using the logic described in Examples 1 and 2. In addition, the preamble selection unit 53 may be provided in the UL signal transmission unit 52. In addition, the preamble selection unit 53 performs the resource selection for the RA preamble transmission in Example 3.

The RRC processing unit 54 performs generation/transmission (transmission is performed through the UL signal transmission unit 52) of the RRC message, interpretation of the RRC message received by the DL signal reception unit 51, and the like. In Example 3, the RRC processing unit 54 acquires and retains the information on the correspondence relationship. In Example 4, the RRC processing unit 54 generates the RRC connection request message and the RRC connection resume request message at the same time. In addition, in Example 4, UL signal transmission unit 52 is configured to include a function of determining whether or not either the RRC connection request message or the RRC connection resume request message is to be transmitted on the basis of the TBS.

The UE context management unit 55 is configured to include a storage means such as a memory and retains the UE context in an RRC suspended state/RRC idle state.

The configuration of the UE illustrated in FIG. 24 may be implemented entirely by a hardware circuit (for example, one or a plurality of IC chips). Alternatively, a portion thereof may be configured by a hardware circuit, and the other portions may be implemented by a CPU and programs.

Figure 25:
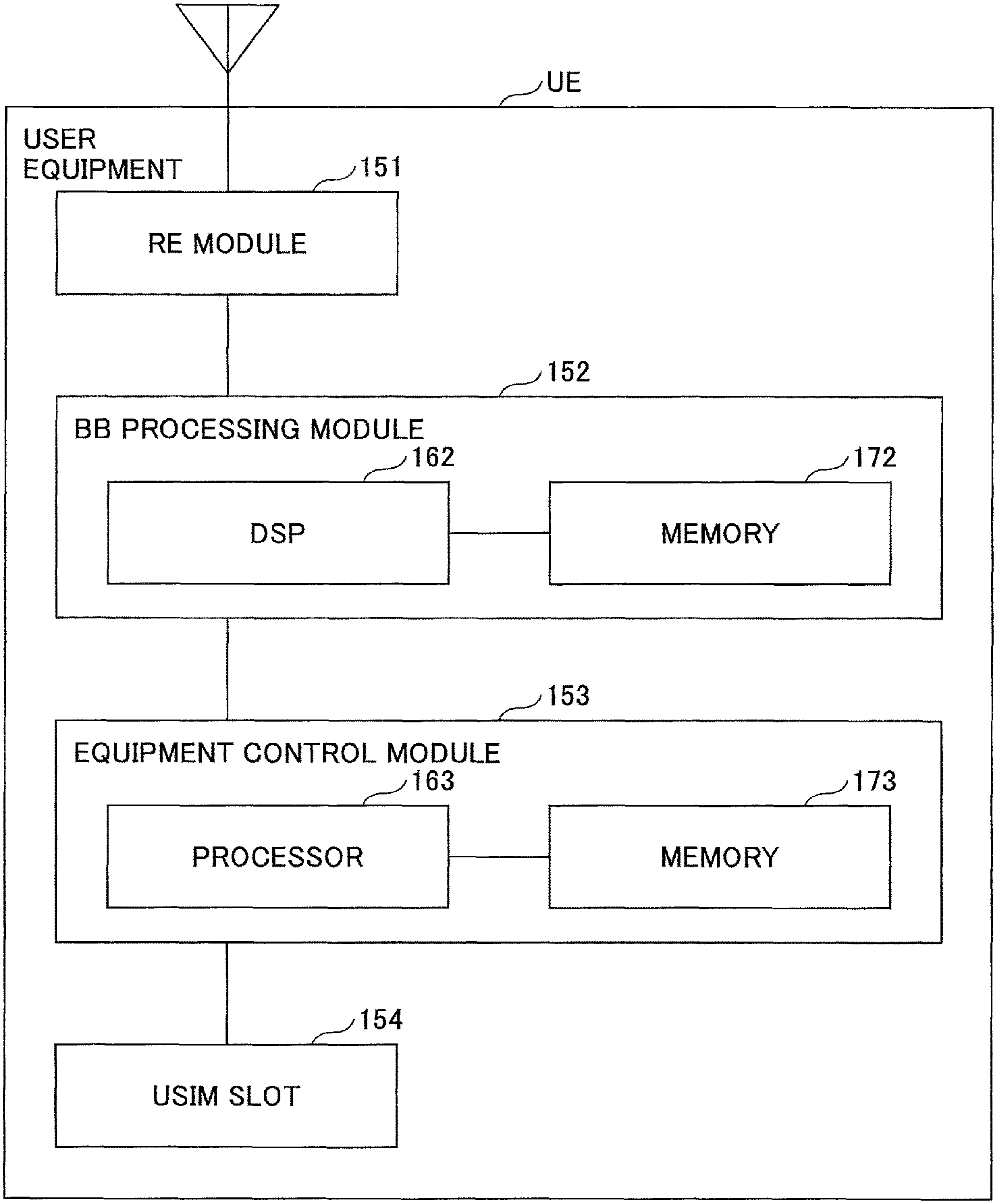
FIG. 25 is an HW configuration diagram of a UE.

FIG. 25 is a diagram illustrating an example of the hardware (HW) configuration of the UE. FIG. 25 illustrates a configuration closer to an implementation example than FIG. 24. As illustrated in FIG. 25, the UE is configured to include a radio equipment (RE) module 151 that performs processing relating to radio signals, a base band (BB) processing module 152 that performs baseband signal processing, an equipment control module 153 that performs processing in the higher layer or the like, and a USIM slot 154 that is an interface for accessing the USIM card.

The RE module 151 performs digital-to-analog (D/A) conversion, modulation, frequency conversion, power amplification and the like on a digital baseband signal received from the BB processing module 152 to generate a radio signal which is to be transmitted from an antenna. In addition, the RE module performs frequency conversion, analog to digital (A/D) conversion, demodulation, and the like on the received radio signal to generate a digital baseband signal and to transfer the digital baseband signal to the BB processing module 152. The RE module 151 is configured to include, for example, functions of the physical layer and the like in the DL signal reception unit 51 and the UL signal transmission unit 52 in FIG. 24.

The BB processing module 152 performs a process of mutually converting the IP packet and the digital baseband signal. A digital signal processor (DSP) 162 is a processor that performs signal processing in the BB processing module 152. The memory 172 is used as a work area of the DSP 162. The BB processing module 152 is configured to include, for example, functions of a layer 2 or the like in the DL signal reception unit 51 and the UL signal transmission unit 52 in FIG. 24, the preamble selection unit 53, the RRC processing unit 54, and the UE context management unit 54. In addition, all or some of the functions of the preamble selection unit 53, the RRC processing unit 54, and the UE context management unit 54 may be included in the equipment control module 153.

The equipment control module 153 performs IP layer protocol processing, processing of various applications, and the like. The processor 163 is a processor that performs processing performed by the equipment control module 153. The memory 173 is used as a work area of the processor 163. In addition, the processor 163 reads and writes data with the USIM through the USIM slot 154.

<Base Station eNB>

Figure 26:
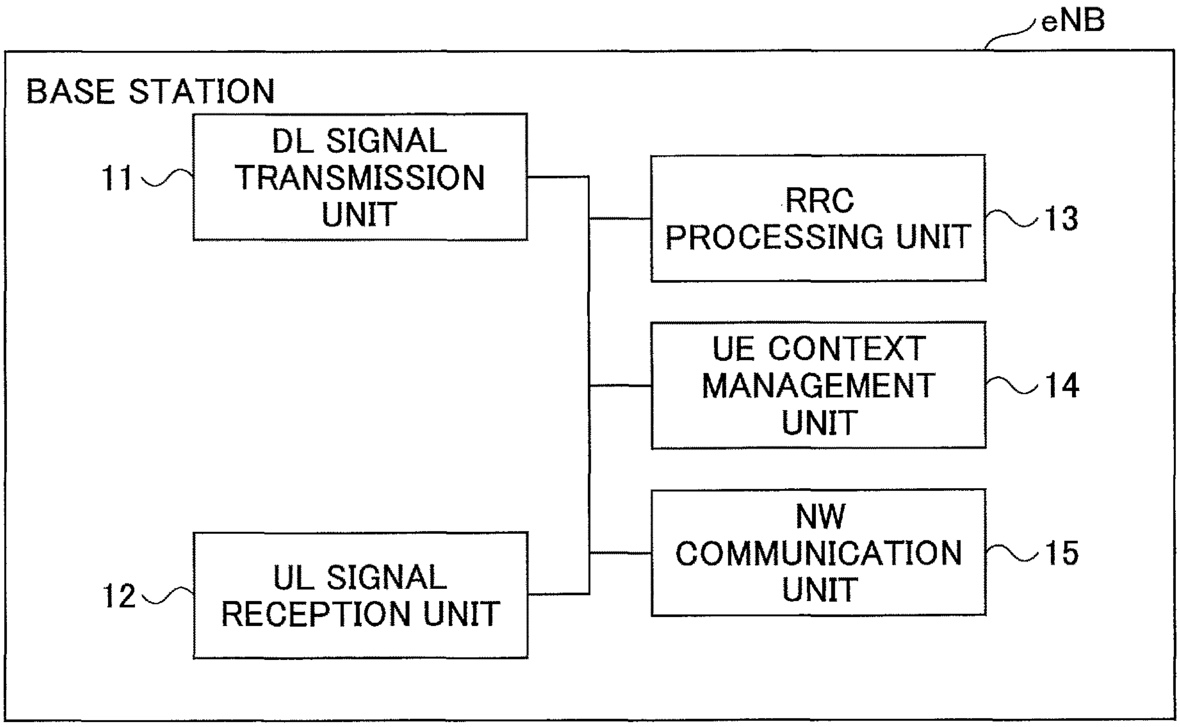
FIG. 26 is a configuration diagram of an eNB.

FIG. 26 illustrates a functional configuration diagram of the eNB. As illustrated in FIG. 26, the eNB is configured to include a DL signal transmission unit 11, a UL signal reception unit 12, an RRC processing unit 13, a UE context management unit 14, and an NW communication unit 15. In addition, FIG. 26 illustrates only the functional units particularly relating to the embodiment of the present invention in the eNB, and the eNB also has functions (not illustrated) for performing at least the operations in accordance with the LTE scheme.

The DL signal transmission unit 11 is configured to include functions of generating and transmitting various signals of a physical layer from information of a higher layer to be transmitted from the eNB. The UL signal reception unit 12 is configured to include functions of receiving various uplink signals from the UE and acquiring the information of the higher layer from the signals of the received physical layer.

The RRC processing unit 13 performs generation/transmission (transmission is performed through the DL signal transmission unit 11) of the RRC message and the system information, interpretation of the RRC message received by the UL signal reception unit 12, operation, and the like. The RRC processing unit 13 is also configured to include a function of resuming the RRC connection by using the UE context retained in the UE context management unit 14.

The UE context management unit 14 is configured to include a storage means such as a memory and retains the UE context in an RRC suspended state/RRC idle state.

The NW communication unit 15 is configured to include a function of transmitting and receiving control signals to and from the MME through the S1-MME interface, a function of transmitting and receiving data to and from the S-GW through the S1-U interface, a function of transmitting a connection maintaining instruction signal, a function of transmitting an RRC connection establishment completion, and the like.

The configuration of the eNB illustrated in FIG. 26 may be implemented entirely by a hardware circuit (for example, one or a plurality of IC chips). Alternatively, a portion thereof may be configured by a hardware circuit, and the other portions may be implemented by a CPU and programs.

Figure 27:
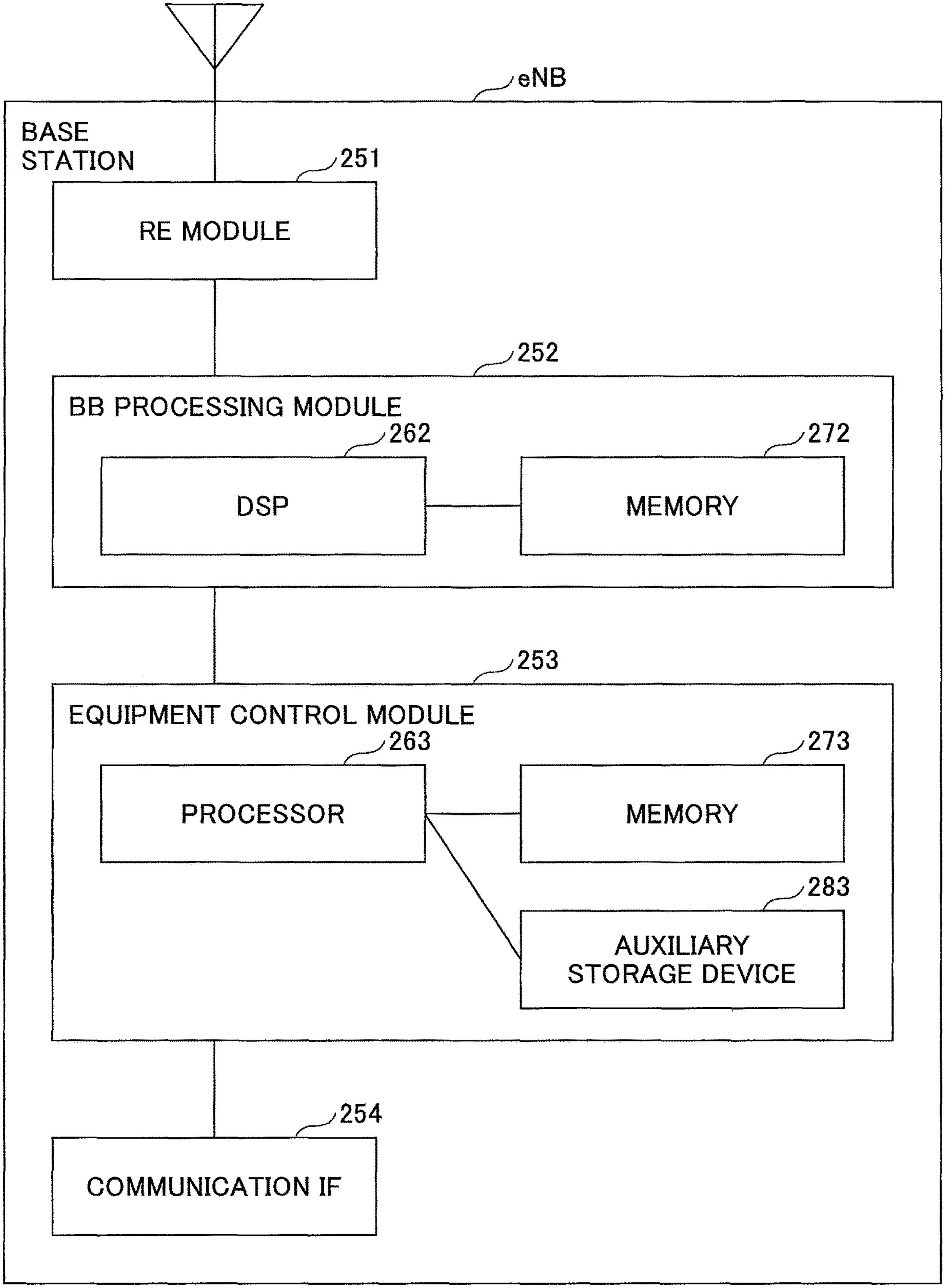
FIG. 27 is an HW configuration diagram of an eNB.

FIG. 27 is a diagram illustrating an example of the hardware (HW) configuration of the eNB. FIG. 27 illustrates a configuration closer to an implementation example than FIG. 26. As illustrated in FIG. 27, the eNB is configured to include an RE module 251 that performs processing relating to radio signals, a BB processing module 252 that performs baseband signal processing, an equipment control module 253 that performs processing in the higher layer or the like, and a communication IF 254 that is an interface for connection to a network.

The RE module 251 performs D/A conversion, modulation, frequency conversion, power amplification, and the like on a digital baseband signal received from the BB processing module 252 to generate a radio signal which is to be transmitted from an antenna. In addition, the RE module performs frequency conversion, A/D conversion, demodulation, and the like on the received radio signal, to generate a digital baseband signal and to transfer the digital baseband signal to the BB processing module 252. The RE module 251 is configured to include functions of the physical layer and the like in the DL signal transmission unit 11 and the UL signal reception unit 12 in FIG. 26.

The BB processing module 252 performs a process of mutually converting the IP packet and the digital baseband signal. The DSP 262 is a processor that performs signal processing in the BB processing module 252. The memory 272 is used as a work area of the DSP 252. The BB processing module 252 is configured to include, for example, functions of a layer 2 or the like in the DL signal transmission unit 11 and the UL signal reception unit 12 in FIG. 25, an RRC processing unit 13, and a UE context management unit 14. In addition, all or some of the functions of the RRC processing unit 13 and the UE context management unit 14 may be included in the equipment control module 253.

The equipment control module 253 performs IP layer protocol processing, OAM processing, and the like. A processor 263 is a processor that performs processing performed by the equipment control module 253. A memory 273 is used as a work area of the processor 263. An auxiliary storage device 283 is, for example, an HDD or the like and stores various kinds of setting information and the like for the base station eNB itself to operate.

In addition, the configuration (function classification) of the device illustrated in FIGS. 24 to 27 is merely an example of the configuration for realizing the processing described in the embodiment. As long as the processing described in the embodiment can be implemented, the implementation method (arrangement, names, and the like of detailed functional units) is not limited to a specific implementation method.

Summary of Embodiments

As described above, according to the embodiment, there is provided is user equipment communicating with a base station in a wireless communication system including the base station and the user equipment, including: a selection unit configured to select a random access signal group from a plurality of random access signal groups and select a random access signal from the random access signal group by comparing a size of a message transmitted through a predetermined logical channel with a predetermined threshold value; and a transmission unit configured to transmit the random access signal selected by the selection unit to the base station, in which the transmission unit transmits the message through the predetermined logical channel by using a resource allocated according to a response from the base station to the random access signal.

According to the above configuration, for example, the base station can grasp the size of the message that the user equipment intends to transmit before transmitting the RA response, and can allocate an appropriate TBS through the UL grant of the RA response. Therefore, it is possible to prevent the user equipment from being unable to transmit the control message due to shortage of uplink resources allocated from the base station.

In a case where the size of the message is larger than the predetermined threshold value, the selection unit may select a random access signal group corresponding to the predetermined threshold value from the two random access signal groups. According to the configuration, for example, by using the existing Group B, it is possible to notify the base station that the user equipment uses a new CCCH SDU size.

In addition, in a case where the size of the message is equal to the predetermined threshold value, the selection unit may select a random access signal group corresponding to the predetermined threshold value from a plurality of the random access signal groups. According to the configuration, for example, by using the Group C which is a new group, it is possible to notify the base station that the user equipment uses the new CCCH SDU size. The random access signal group corresponding to the predetermined threshold value is, for example, messageSizeGroupC.

Furthermore, in the above example, in a case where the size of the message is larger than the predetermined threshold value and a path loss is smaller than a predetermined value, the selection unit may select, from the plurality of random access signal groups, a predetermined random access signal group different from the random access signal group corresponding to the predetermined threshold value of the random access signal group. According to the configuration, for example, by using the existing Group B, it is possible to notify the base station that the user equipment uses a message larger than messageSizeGroupC.

The selection unit may determine whether or not a first condition that the size of the message is larger than the predetermined threshold value and a path loss is smaller than a predetermined value is satisfied; if the first condition is not satisfied, the selection unit may determine whether or not a second condition that the size of the message is equal to the predetermined threshold value is satisfied; and if the second condition is satisfied, the selection unit may select a random access signal group corresponding to the predetermined threshold value. According to the configuration, for example, by using the Group C which is a new group, it is possible to notify the base station that the user equipment uses the new CCCH SDU size.

In the above example, if the second condition is not satisfied, the selection unit may determine whether or not a third condition that the size of the message is smaller than the predetermined threshold value, the size of the message is larger than a predetermined second threshold value, and a path loss is smaller than a predetermined value is satisfied;

if the third condition is satisfied, the selection unit may select a random access signal group corresponding to a size between the predetermined second threshold value and the predetermined threshold value; and if the third condition is not satisfied, the selection unit may select a random access signal group corresponding to the predetermined second threshold value. According to the configuration, for example, as illustrated in FIG. 12, it is possible to divide the message size into a plurality of patterns and notify the base station of each pattern.

In addition, according to the embodiment, there is provided user equipment communicating with a base station in a wireless communication system including the base station and the user equipment, including: a reception unit which receives, from the base station, information on a correspondence relationship between a size of a message transmitted through a predetermined logical channel and a resource of a random access signal; a selection unit configured to select a resource corresponding to the size of the message transmitted through the predetermined logical channel from the information on the correspondence relationship; and a transmission unit configured to transmit a random access signal to the base station by using the selected resource.

According to the above configuration, for example, the base station can grasp the size of the message that the user equipment intends to transmit before transmitting the RA response, and can allocate an appropriate TBS through the UL grant of the RA response. Therefore, it is possible to prevent the user equipment from being unable to transmit the control message due to shortage of uplink resources allocated from the base station.

The resource is, for example, a sequence of random access signals or a time and frequency resource used for transmission of a random access signal. In this manner, flexible resource control can be performed by using various kinds of information as resources.

In addition, according to the embodiment, there is provided a random access method executed by user equipment communicating with a base station in a wireless communication system including the base station and the user equipment, the random access method including: a selection step of selecting a random access signal group from a plurality of random access signal groups and selecting a random access signal from the random access signal group by comparing a size of a message transmitted through a predetermined logical channel with a predetermined threshold value; a transmission step of transmitting the random access signal selected in the selection step to the base station; and a transmission step of transmitting the message through the predetermined logical channel by using a resource allocated according to a response from the base station to the random access signal.

In addition, according to the embodiment, there is provided a random access method executed by user equipment communicating with a base station in a wireless communication system including the base station and the user equipment, the random access method including: a reception step of receiving, from the base station, information on a correspondence relationship between a size of a message transmitted through a predetermined logical channel and a resource of a random access signal; a selection step of selecting a resource corresponding to the size of the message transmitted through the predetermined logical channel from the information on the correspondence relationship; and a transmission step of transmitting a random access signal to the base station by using the selected resource.

In addition, according to the embodiment, there is provided user equipment communicating with a base station in a wireless communication system including the base station and the user equipment, including: a generation unit configured to generate a first message and a second message having a size smaller than that of the first message; and a transmission unit configured to transmit the first message to the base station in a case where the first message can be transmitted and to transmit the second message to the base station in a case where the first message cannot be transmitted according to an amount of resources allocated according to a response from the base station to a random access signal transmitted to the base station.

According to the above configuration, it is possible to prevent the user equipment from being unable to transmit the control message due to shortage of uplink resources allocated from the base station.

The exemplary embodiments of the present invention are described above; however, the disclosed invention is not limited to the above embodiments, and those skilled in the art would understand that various modified examples, revised examples, alternative examples, substitution examples, and the like can be made. In order to facilitate understanding of the invention, specific numerical value examples are used for description, but the numerical values are merely examples, and certain suitable values may be used unless as otherwise indicated. A classification of items in the above description is not essential to the present invention, matters described in two or more items may be combined and used as necessary, and a matter described in one item may be applied to a matter described in another item (provided that they do not contradict). The boundary between functional units or processing units in a functional block diagram does not necessarily correspond to the boundary between physical parts. Operations of a plurality of functional units may be performed physically by one component, or an operation of one functional unit may be performed physically by a plurality of parts. For the sake of convenience of description, each device has been described using the functional block diagrams, but each device may be implemented by hardware, software, or a combination thereof. According to an embodiment of the present invention, software operated by the processor of the device may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Notification of information is not limited the aspect/embodiment described in the present specification any may be performed by other methods. For example, notification of information may be performed via physical layer signaling (for example, Downlink Control Information (DCI) or Uplink Control Information (UCI)), upper-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Furthermore, each aspect/embodiment described in this specification can be applied to long term evolution (LTE), LTE-advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wideband (UWB), Bluetooth (registered trademark), any other systems using an appropriate system and/or next generation systems expanded on the basis of these systems.

Determination or decision may be made by a value (0 or 1) represented by one bit, may be made by a Boolean value (Boolean: true or false), and may be made by comparison of numerical values (comparison with a predetermined value, for example).

Note that the terms described in this specification and/or the terms necessary for understanding of this specification may be replaced with terms having the same or similar meaning. For example, the channel and/or symbol may be signaling (signal). Furthermore, a signal may be a message.

The UE may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or it may also be called by some other suitable terms.

Each aspect/embodiment described in this specification may be used alone, may be used in combination, or may be used while being switched during the execution. Furthermore, notification of predetermined information (e.g., notification of "being X") is not limited to notification that is made explicitly, and the notification may be made implicitly (e.g., notification of the predetermined information is not performed).

The terms "determining" and "deciding" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least".

In addition, processing procedures, sequences, flowcharts, and the like of each embodiment/modified example described in the specification may be exchanged as long as there is no inconsistency. For example, for the methods described in the specification, the elements of the various steps are presented in an exemplary order and are not limited to a specific order presented.

Input and output Information and the like may be stored in a specific location (for example, a memory) and may be managed by a management table. The input and output information and the like may be overwritten, updated, or rewritten. The output information and the like may be erased. The input information and the like may be transmitted to other apparatuses.

Notification of predetermined information (e.g., notification of "being X") is not limited to notification that is made explicitly, and the notification may be made implicitly (e.g., notification of the predetermined information is not performed).

Information, signals, and the like described in the present specification may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

In addition, information, parameters, and the like described in the specification may be represented by absolute values, may be represented by relative values from predetermined values, or may be represented by another corresponding information. For example, the radio resource may be indicated by an index. The names used for the above parameters are not limitative in any points.

The present invention is not limited to the above-described embodiments, and various modified examples, changed examples, alternative examples, substituted examples, and the like are included in the present invention without departing from the spirit of the present invention.

This international patent application is based upon and claims the benefit of priority of Japanese Patent Application No. 2016-042819 filed on Mar. 4, 2016 and Japanese Patent Application No. 2016-105565 filed on May 26, 2016, and the entire contents of Japanese Patent Application No. 2016-042819 and Japanese Patent Application No. 2016-105565 are incorporated herein by reference.

LIST OF REFERENCE SYMBOLS

10, 20 eNB
11 DL signal transmission unit
12 UL signal reception unit
13 RRC processing unit
14 UE context management unit
15 NW communication unit
30 MME
40 S-GW
50 UE
51 DL signal reception unit
52 UL signal transmission unit
53 preamble selection unit
54 RRC processing unit
55 UE context management unit
151 RE module
152 BB processing module
153 equipment control module
154 USIM slot
251 RE module
252 BB processing module
253 equipment control module
254 communication IF

The invention claimed is:

1. A user equipment communicating with a base station of a wireless communication system including the base station and the user equipment, the user equipment comprising:

a processor that:

selects a random access signal group from a plurality of random access signal groups by comparing, with a predetermined threshold value, a size of a Common Control Channel Service Data Unit (CCCH SDU) added with a MAC header, the CCCH SDU being a Radio Resource Control connection resume message for resuming a Radio Resource Control connection transmitted via a common control channel; and selects a random access signal from the random access signal group; and a transmitter that transmits the random access signal selected by the processor to the base station, wherein the transmitter transmits the CCCH SDU through the common control channel using a resource allocated by a response from the base station with respect to the random access signal.

2. The user equipment according to claim 1, wherein, upon detecting that the size of the CCCH SDU added with the MAC header is greater than the predetermined threshold value, the processor selects a random access signal group corresponding to a case where the size is greater than the predetermined threshold value from the two random access signal groups.

3. The user equipment according to claim 1, wherein, upon detecting that the size of the CCCH SDU added with the MAC header is equal to the predetermined threshold value, the processor selects a random access signal group corresponding to the predetermined threshold value from the plurality of random access signal groups.

4. The user equipment according to claim 3, wherein, upon detecting that the size of the CCCH SDU added with the MAC header is greater than the predetermined threshold value and a path loss is smaller than a predetermined value, the processor selects, from the plurality of random access signal groups, a predetermined random access signal group different from the random access signal group corresponding to the predetermined threshold value.

5. The user equipment according to claim 1, wherein the processor determines whether a first condition is satisfied, the first condition being such that the size of the CCCH SDU added with the MAC header is greater than the predetermined threshold value and a path loss is smaller than a predetermined, and determines whether a second condition is satisfied, the second condition being such that the size of the CCCH SDU added with the MAC header is equal to the predetermined threshold value in response to detecting that the first condition is not satisfied, and selects a random access signal group corresponding to the predetermined threshold value in response to detecting that the second condition is satisfied.

6. The user equipment according to claim 5, wherein, upon detecting that the second condition is not satisfied, the processor determines whether or not a third condition is satisfied, the third condition being such that the size of the CCCH SDU added with the MAC header is smaller than the predetermined threshold value, the size of the CCCH SDU added with the MAC header is larger than a predetermined second threshold value, and a path loss is smaller than a predetermined value, and wherein the processor selects a random access signal group corresponding to a size between the predetermined second threshold value and the predetermined threshold value in response to detecting that the third condition is satisfied, and the processor selects a random access signal group corresponding to the predetermined second threshold value in response to detecting that the third condition is not satisfied.

7. A random access method executed by user equipment communicating with a base station of a wireless communication system including the base station and the user equipment, the random access method comprising:

selecting a random access signal group from a plurality of random access signal groups by comparing, with a predetermined threshold value, a size of a Common Control Channel Service Data Unit (CCCH SDU) added with a MAC header, the CCCH SDU being a Radio Resource Control connection resume message for resuming a Radio Resource Control connection transmitted via a common control channel, and selecting a random access signal from the random access signal group;

transmitting the selected random access signal to the base station; and transmitting the CCCH SDU through the common control channel by using a resource allocated according to a response from the base station with respect to the random access signal.

* * * * *